United States Patent
Schaapman et al.

(10) Patent No.: US 10,435,586 B2
(45) Date of Patent: *Oct. 8, 2019

(54) OLIGOESTERS AND COMPOSITIONS THEREOF

(71) Applicant: Kraton Chemical, LLC, Jacksonville, FL (US)

(72) Inventors: Mark C Schaapman, Almere (NL); Jos H. M. Lange, Almere (NL); Pieter Eduard, Utrecht (NL); Ronnie Zeeman, Utrecht (NL)

(73) Assignee: Kraton Chemical, LLC, Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/396,258

(22) Filed: Dec. 30, 2016

(65) Prior Publication Data

US 2017/0190935 A1 Jul. 6, 2017

Related U.S. Application Data

(60) Provisional application No. 62/273,760, filed on Dec. 31, 2015.

(51) Int. Cl.
| | | |
|---|---|---|
| G09F 1/04 | (2006.01) | |
| C08L 93/04 | (2006.01) | |
| C08K 5/053 | (2006.01) | |
| C08L 9/06 | (2006.01) | |
| C09J 193/04 | (2006.01) | |
| C08K 5/09 | (2006.01) | |
| C09F 1/04 | (2006.01) | |

(52) U.S. Cl.
CPC ............... *C09F 1/04* (2013.01); *C08K 5/053* (2013.01); *C08K 5/09* (2013.01); *C08L 9/06* (2013.01); *C08L 93/04* (2013.01); *C09J 193/04* (2013.01)

(58) Field of Classification Search
CPC ... C08L 93/04; C08L 9/06; C09F 1/04; C08K 5/053; C08K 5/09; C09J 193/04
See application file for complete search history.

(56) References Cited

U.S. PATENT DOCUMENTS

| | | |
|---|---|---|
| 1,820,265 A | 8/1931 | Bent et al. |
| 2,518,497 A | 8/1950 | Rust |
| 2,729,660 A | 1/1956 | Harrison |
| 2,791,568 A | 5/1957 | Shapiro et al. |
| 2,889,293 A | 6/1959 | Hensley et al. |
| 2,965,588 A | 12/1960 | Spencer |
| 3,310,575 A | 3/1967 | Spivack |
| 3,423,389 A | 1/1969 | Wheelus |
| 3,780,013 A | 12/1973 | Smith |
| 3,959,410 A | 5/1976 | DiRossi |
| 4,100,119 A | 7/1978 | Lerman |
| 4,172,070 A | 10/1979 | Scharrer et al. |
| 4,302,371 A | 11/1981 | Matsuo et al. |
| 4,368,316 A | 1/1983 | Laddha et al. |
| 4,377,510 A | 3/1983 | Ruckel et al. |
| 4,380,513 A | 4/1983 | Ruckel et al. |
| 4,548,746 A | 10/1985 | Duncan et al. |
| 4,657,703 A | 4/1987 | Durkee |
| 4,690,783 A | 9/1987 | Johnson, Jr. |
| 4,693,847 A | 9/1987 | Johnson, Jr. |
| 4,725,384 A | 2/1988 | Du Vernet |
| 4,744,925 A | 5/1988 | Lampo et al. |
| 4,788,009 A | 11/1988 | Johnson, Jr. |
| 5,021,548 A | 6/1991 | Minn |
| 5,036,129 A | 7/1991 | Atwell et al. |
| 5,049,652 A | 9/1991 | Minn |
| 5,504,152 A | 4/1996 | Schluenz et al. |
| 2007/0179277 A1* | 8/2007 | Dallavia ............... C08G 63/48 530/210 |
| 2011/0034669 A1 | 2/2011 | Dallavia |
| 2012/0202058 A1 | 8/2012 | Takahira et al. |
| 2013/0150484 A1 | 6/2013 | Basu et al. |

(Continued)

FOREIGN PATENT DOCUMENTS

| | | |
|---|---|---|
| EP | 0112446 B1 | 5/1986 |
| EP | 2835390 B1 | 3/2016 |
| FR | 1237374 | 9/1959 |
| GB | 480336 | 2/1938 |
| GB | 563554 | 8/1944 |
| GB | 599546 | 3/1948 |
| GB | 680996 | 10/1952 |
| GB | 729424 | 5/1955 |
| GB | 1100392 | 1/1968 |
| WO | 2013/167662 A1 | 11/2013 |
| WO | 2015/052342 A1 | 4/2015 |

(Continued)

OTHER PUBLICATIONS

Anderson et al "The Fat Acids of American Tall Oil", Oil and Soap, pp. 138-141, Jun. 1945.*

*Primary Examiner* — Ling Siu Choi
*Assistant Examiner* — Gennadiy Mesh
(74) *Attorney, Agent, or Firm* — Ramesh Krishnamurti

(57) ABSTRACT

An oligoester composition is disclosed, which is a reaction product of a reactant mixture comprising one or more rosins selected from the group consisting of tall oil rosin and gum rosin; at least 15% by weight of one or more monocarboxylic acids comprising 6-36 carbon atoms; and one or more polyhydric alcohols comprising 2-36 carbon atoms, wherein each hydroxyl group of the polyhydric alcohol is separated from the other hydroxyl groups by at least 2 carbon atoms. A method for preparing an oligoester composition is also provided. Also disclosed is an oligoester composition which is an esterification reaction product of one or more rosins, one or more monocarboxylic acids, one or more polyhydric alcohols, and optionally one or more polycarboxylic acids. The composition has a weight average molecular weight of from 500 g/mol to 8,000 g/mol and a $T_g$ of between −80° C. and 100° C.

21 Claims, 5 Drawing Sheets

(56) References Cited

U.S. PATENT DOCUMENTS

| | | |
|---|---|---|
| 2013/0197152 A1 | 8/2013 | Herve et al. |
| 2015/0114261 A1 | 4/2015 | Thevasahayam |
| 2015/0315429 A1 | 11/2015 | McLennaghan |

* cited by examiner

OLIGOESTERS AND COMPOSITIONS THEREOF

CROSS-REFERENCE TO RELATED APPLICATIONS

This application claims priority from U.S. Provisional Application No. 62/273,760 filed on Dec. 31, 2015, the entire disclosures of which are incorporated herein by reference for all purposes.

TECHNICAL FIELD

This application relates generally to oligoesters, as well as methods of making and using thereof.

BACKGROUND

Rosin esters, including rosin esters derived from polyhydric alcohols, have been known for more than 50 years. See, for example, U.S. Pat. No. 1,820,265 to Bent, et al. Rosin esters are typically formed by the reaction of rosin, which is primarily a mixture of isomeric $C_{20}$ tricyclic mono-carboxylic acids known as rosin acids, with alcohols such as glycerol or pentaerythritol. The resultant rosin esters serve as additives in a variety of applications, including as tackifiers in hot-melt and pressure-sensitive adhesives, modifiers for rubbers and various plastics, emulsifiers for synthetic rubbers, base materials for chewing gum, resins in coating compositions such as traffic paints and inks, and sizing agents for paper making.

While suitable for many applications, many existing rosin esters fail to possess suitable properties for particular applications. Notably, many commercially available rosin esters are colored (e.g., yellow or yellowish brown) and exhibit poor oxidative stability. Furthermore, many existing rosin esters do not comply with current regulatory standards for use in food packaging applications. In addition, the balance between tack, peel, and shear properties of many existing liquid rosin ester-based pressure sensitive adhesives (PSAs) is not optimal. Finally, many existing rosin esters are relatively polar compounds that may be incompatible with less polar polymers, such as polyolefins. Accordingly, there continues to be a need for rosin-based compositions which exhibit improved properties.

SUMMARY

Disclosed herein is an oligoester composition which is a reaction product of a reactant mixture comprising one or more rosins; at least 15% by weight of one or more monocarboxylic acids; and one or more polyhydric alcohols.

Also disclosed herein is a method for preparing an oligoester composition comprising (a) esterifying a mixture comprising one or more rosins, one or more monocarboxylic acids, and optionally one or more polycarboxylic acids with one or more polyhydric alcohols to form the oligoester composition.

Also disclosed herein is an oligoester composition which is an esterification reaction product of one or more rosins, one or more monocarboxylic acids, one or more polyhydric alcohols, and optionally one or more polycarboxylic acids, wherein the composition has a weight average molecular weight of from 500 g/mol to 8,000 g/mol and a Tg of between −80° C. and 100° C.

Also disclosed herein is an oligoester composition which is the reaction product of one or more rosins; one or more monocarboxylic acids; one or more polyhydric alcohols; and less than Q % by weight one or more polycarboxylic acids, where Q is defined by the formula below $$10 - 2\left( \sum_{\substack{polycarboxylic \\ acids}} (XY) \right)$$

wherein Σ denotes the mathematical summation of the product of X and Y for each of the one or more polycarboxylic acids; X is the carboxylic acid functionality of the polycarboxylic acid, and is an integer ranging from 2 to 4; and Y is the polycarboxylic acid weight fraction of the polycarboxylic acid, and ranges from 0 to 1 where the sum of the weight fractions for the one or more polycarboxylic acids equals 1; wherein the oligoester composition has a softening point of 85° C. or less; and wherein the oligoester composition has a hydroxyl value of 30 mg KOH/g or less.

Also disclosed herein is a pressure sensitive adhesive (PSA) comprising a polymer and an oligoester, wherein the adhesive exhibits a loop tack adhesion value on stainless steel of at least 25 Newton/25 mm, a 180° peel adhesion on stainless steel after 20 minutes of at least 20 Newton/25 mm, a shear adhesion time of at least 3000 minutes, and a SAFT failure temperature of at least 55° C.

DETAILED DESCRIPTION

Figure 1:
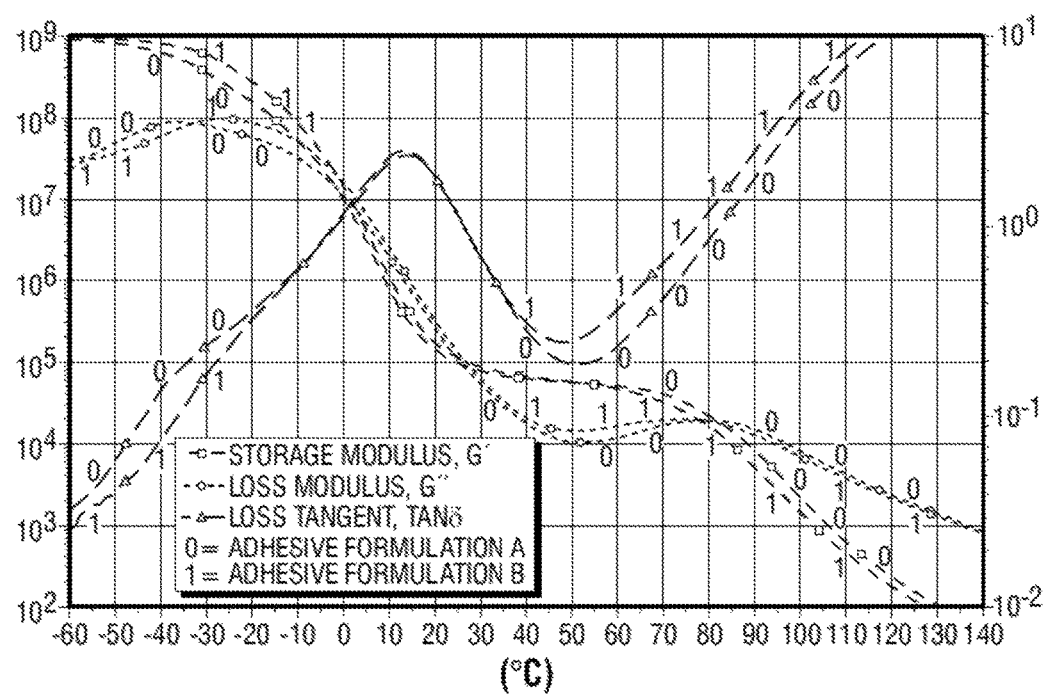
FIG. 1 is a plot showing the dynamic mechanical analysis results for Adhesive Formulation A and Adhesive Formulation B.

Provided herein are oligoesters and oligoester compositions. An oligoester composition of the present disclosure may comprise, consist of, or consist essentially of the oligoesters disclosed herein. In an aspect, the oligoester composition comprises from 1 weight percent (wt. %) to 100 wt. % of one or more oligoesters of the type disclosed herein based on the total weight of the composition, alternatively from 10 wt. % to 100 wt. %, alternatively from 20 wt. % to 80 wt. %, alternatively from 30 wt. % to 70 wt. %. In some aspects the oligoester composition comprises equal to or less than about 20 wt. % of any non-oligoester based on the weight of the oligoester composition, alternatively less than 10 wt. %, or alternatively less than 5 wt. %. The oligoester compositions may exhibit improved color (e.g., the oligoester may have a neat Gardner color of 7 or less), improved oxidative stability (e.g., the oligoester composition may exhibit an oxidative-induction time at 110° C. of at least 30 minutes), improved color stability (e.g., the oligoester may exhibit less than a 10% change in neat Gardner color when heated to a temperature of 160° C. for a period of three hours), or combinations thereof.

In certain aspects, the oligoester compositions may be suitable for use in materials (e.g., adhesives) approved for food contact. For example, in some aspects, the oligoester may meet the definition of a polymer under the European REACH regulations, and comply with the requirements set forth in Commission Regulation (EU) No. 10/2011 of Jan. 14, 2011 on plastic materials and articles intended to come into contact with food. In particular aspects, more than 50% by weight of the oligoester composition comprises "polymer molecules" (i.e., molecules formed from three or more monomer units covalently bound together), and none of the "polymer molecules" having the same molecular weight account for more than 50 weight percent of the oligoester composition. These values can be determined by means of gel permeation chromatography (GPC) of the oligoester composition. Integration of the relevant parts of the resulting GPC graph will deliver an approximate value of the weight percentage of "polymer molecules" and an approximate value of the weight percentage of "polymer molecules" having the same molecular weight, respectively. In certain aspects, the oligoester composition may have a weight average molecular weight of at least 700 g/mol (e.g., a weight average molecular weight of from 1,000 g/mol to 5,000 g/mol). In certain aspects, less than 35 percent by weight (e.g., less than 20 percent by weight, or less than 10 percent by weight) of the oligoester composition has a molecular weight of less than 1,000 g/mol. In certain aspects, less than 25 percent by weight (e.g., less than 10 percent by weight, or less than 4 percent by weight, or less than 2 percent by weight) of the oligoester composition has a molecular weight of less than 500 g/mol as determined by GPC.

The oligoester compositions described herein may be derived from one or more rosins. Rosin, also called colophony or Greek pitch (Pix græca), is a solid hydrocarbon secretion of plants, typically of conifers such as pines (e.g., *Pinus palustris* and *Pinus caribaea*). Rosin may include a mixture of rosin acids, with the precise composition of the rosin varying depending in part on the plant species. Rosin acids are C20 fused-ring monocarboxylic acids with a nucleus of three fused six-carbon rings containing double bonds that vary in number and location. Examples of rosin acids include abietic acid, neoabietic acid, dehydroabietic acid, dihydroabietic acid, pimaric acid, levopimaric acid, sandaracopimaric acid, isopimaric acid, and palustric acid. Natural rosin typically consists of a mixture of several primarily abietic-type and pimaric-type acids in combination with minor amounts of other components.

Rosin is commercially available, and may be obtained from pine trees by distillation of oleoresin (gum rosin being the residue of distillation), by extraction of pine stumps (wood rosin) or by fractionation of tall oil (tall oil rosin). Any type of rosin may be used to prepare the oligoester compositions described herein, including tall oil rosin, gum rosin and wood rosin and mixtures thereof. If desired, rosin may be subjected to one or more purification steps (e.g., distillation under reduced pressure, extraction, and/or crystallization) prior its use as a rosin in the esterifying steps described herein. Hydrogenated rosins and partially hydrogenated rosins may also be used as a rosin source. An example of commercially available hydrogenated rosin suitable for use in the present disclosure is FORAL™ AX-E, which is marketed by Eastman Chemical Company. Examples of commercially available hydrogenated rosin include without limitation STAYBELITE™ Resin-E, which is marketed by Eastman Chemical Company, and HYDROGAL™, which is marketed by DRT (Dérivés Résiniques et Terpéniques).

In certain aspects, the oligoester is derived from tall oil rosin (TOR). Nonlimiting examples of commercially available TOR include SYLVAROS™ 90S, SYLVAROS™ HYR, SYLVAROS™ NCY, SYLVAROS™ 85S, SYLVAROS™ 90F, and SYLVAROS™ R type S, commercially available from Arizona Chemical, a subsidiary of Kraton Corporation.

Crude tall oil (CTO), as obtained from the Kraft paper pulping process, includes substantial amounts of TOR and tall oil fatty acid (TOFA). Distilled tall oil (DTO) constitutes an industrial refinery output obtained from crude tall oil fractionated distillation. DTO mainly includes TOR and TOFA (a mixture of several monocarboxylic acids). DTO may therefore also be used as a suitable starting point for the preparation of oligoester compositions of the type disclosed herein, as it includes both TOR and one or more monocarboxylic acids. Several commercial DTO grades with varying rosin content are commercialized as the SYLVATAL™ product line by Arizona Chemical, a subsidiary of Kraton Corporation, including SYLVATAL™ 10S, SYLVATAL™ 20/25S, SYLVATAL™ 20S, SYLVATAL™ 25/30S, SYLVATAL™ D25 LR, SYLVATAL™ D30 LR, and SYLVATAL™ D40 LR.

In some aspects, the oligoester composition may be derived from 5 weight percent (wt. %) to 80 wt. %, alternatively 10 wt. % to 70 wt. %, or alternatively 30 wt. % to 60 wt. % rosin, based on the total weight of the components used to form the oligoester composition.

As described above, rosin includes a mixture of rosin acids (e.g., abietadienoic acids) which may include conjugated double bonds within their ring systems. These conjugated double bonds may be a source of oxidative instability. Accordingly, in some cases, the rosin, oligoester, or combinations thereof are processed to decrease the weight percent of components which include conjugated double bonds. The term "PAN number", as used herein, specifically refers to the sum of the weight percentages of palustric, abietic and neoabietic acid moieties as obtained by hydrolysis from the oligoester, as determined according to method described in ASTM D5974-00 (2010).

In some aspects, the oligoester may be derived from a rosin having a low PAN number. In some aspects, the rosin as obtained by hydrolysis from the oligoester may have a PAN number, as determined according to the method described in ASTM D5974-00 (2010), of equal to or less than 25, alternatively equal to or less than 15, or alternatively equal to or less than 5. The rosin as obtained by hydrolysis from the oligoester may comprise from equal to or greater than 30 wt. % dehydroabietic acid, alternatively from 30 wt. % to 60 wt. %, or alternatively from 40 wt. % to 55 wt. % based on the total weight of the rosin. In some aspects, the weight ratio of dehydroabietic acid to dihydroabietic acid in the rosin as obtained by hydrolysis from the oligoester ranges from 1:0.80 to 1:0.25, alternatively from 1:0.70 to 1:0.35, or alternatively from 1:0.55 to 1:0.40.

The oligoester compositions described herein may be derived from one or more monocarboxylic acids. In some aspects, the oligoester composition may be derived from 15 wt. % to 90 wt. %, alternatively from 30 wt. % to 80 wt. %, or alternatively from 40 wt. % to 75 wt. % of one or more monocarboxylic acids, based on the total weight of the components used to form the oligoester composition.

The one or more monocarboxylic acids may be any suitable carboxylic acids. Nonlimiting examples of suitable monocarboxylic acids include aromatic monofunctional carboxylic acids, heteroaromatic monofunctional carboxylic acids, aliphatic monofunctional carboxylic acids, unsaturated linear or branched monofunctional carboxylic acids, partially unsaturated linear or branched monofunctional carboxylic acids, cycloaliphatic monofunctional carboxylic acids, partly unsaturated cyclic monofunctional carboxylic acids, natural fatty acids, synthetic fatty acids, fatty acids derived from vegetable oils and animal oils, and combinations thereof.

In some cases, the one or more monocarboxylic acids may comprise at least six carbon atoms (e.g., from 6-36 carbon atoms, from 6-32 carbon atoms, from 6-25 carbon atoms, from 6-22 carbon atoms, from 6-18 carbon atoms, or from 6-12 carbon atoms). Monocarboxylic acids may include a combination of linear, branched, cyclic aliphatic (cycloaliphatic), partially unsaturated, or aromatic or heteroaromatic chemical moieties, and may optionally include one or more additional functional groups in addition to the carboxylic acid moiety, such as a hydroxyl, alkyl (e.g., C1-3 alkyl), aryl (e.g., benzyl), alkoxy (e.g., methoxy), haloalkyl (e.g., trifluoromethyl), or keto group. In the case of aromatic monocarboxylic acids, the aromatic ring may optionally include one or more ring substituents, such as a fluoro, chloro, alkyl (e.g., methyl or ethyl), methoxy, or trifluoromethyl group. If desired, the one or more monocarboxylic acids may further include one or more heteroatoms (e.g., one or more oxygen, sulfur or nitrogen atoms) incorporated in the carboxylic acid molecular structure, such as for example an ether group in the case of oxygen atom incorporation or a thioether in the case of sulfur atom incorporation.

Nonlimiting examples of suitable aliphatic monocarboxylic acids include formic acid, acetic acid, propionic acid, butyric acid, valeric acid, caproic acid, enanthic acid, caprylic acid, pelargonic acid, capric acid, lauric acid, myristic acid, palmitic acid, stearic acid, arachidic acid, behenic, and cerotic acid. An example of a suitable aromatic monocarboxylic acid is benzoic acid. Nonlimiting examples of suitable cycloaliphatic monocarboxylic acids include cyclopropanecarboxylic acid, cyclopentanecarboxylic acid and cyclohexanecarboxylic acid. Nonlimiting examples of suitable unsaturated linear or branched monocarboxylic acids include linoleic acid, alpha-linolenic acid, elaidic acid, sapienic acid, arachidonic acid, myristoleic acid, palmitoleic acid, and oleic acid. Nonlimiting examples of suitable fatty acids derived from vegetable oils (e.g., triglyceride vegetable oils) and animal fats and oils include palm oil, linseed oil, rapeseed oil, sunflower seed oil, olive oil, tung oil, peanut oil, cottonseed oil, palm kernel oil, soybean oil, corn oil, grapeseed oil, hazelnut oil, rice bran oil, safflower oil, sesame oil, butterfat, and coconut oil. Such fatty acids may include without limitation, for example, linoleic acid, alpha-linolenic acid, palmitic acid, stearic acid, myristic acid, and oleic acid. Nonlimiting examples of natural fatty acids are tall oil fatty acid and commercial products thereof, such as isostearic acid.

In certain cases, the one or more monocarboxylic acids may comprise oleic acid, linoleic acid, alpha-linolenic acid, palmitic acid, stearic acid, or combinations thereof. In certain aspects, the one or more monocarboxylic acids may comprise a tall oil fatty acid (TOFA). Suitable TOFA derived commercially available monocarboxylic acids are for example and without limitation part of the CENTURY™ product line as marketed by Arizona Chemical, a subsidiary of Kraton Corporation, such as CENTURY™ D1, CENTURY™ MO5, CENTURY™ MO5N and isostearic acid products such as CENTURY™ 1105, and CENTURY™ 1107.

Carboxylic acids and their derivatives may be characterized by their iodine number. In certain aspects, the one or more monocarboxylic acids may have an iodine number of less than 275 mg/g, alternatively less than 180 mg/g, alternatively less than 115 mg/g, alternatively less than 80 mg/g, alternatively from 55 mg/g to 270 mg/g, alternatively from 60 mg/g to 250 mg/g, or alternatively from 70 mg/g to 200 mg/g as determined according to the method described in ASTM D5768-02 (2014).

The oligoester compositions described herein may further be derived from one or more polyhydric alcohols. In some aspects, the oligoester composition may be derived from 5 wt. % to 40 wt. %, alternatively 5 wt. % to 30 wt. %, alternatively 9 wt. % to 18 wt. %, or alternatively 9.7 wt. % to 12.7 wt. % by weight polyhydric alcohols, based on the total weight of the components used to form the oligoester composition.

The one or more polyhydric alcohols may comprise any suitable polyhydric alcohols. In some aspects, the one or more polyhydric alcohols may have an average hydroxyl functionality from 2 to 10, alternatively from 2 to 7, or alternatively from 3 to 5.

In some cases, the one or more polyhydric alcohols comprise from 2 to 36, alternatively from 2 to 20 or alternatively from 2 to 8 carbon atoms. In some cases, the one or more polyhydric alcohols may have a boiling point greater than 240° C. at 1 atm.

Polyhydric alcohols may include a combination of linear, branched, cyclic aliphatic, partially unsaturated, or aromatic chemical moieties, and may optionally include one or more additional functional groups in addition to the two or more hydroxyl moieties, such as an alkyl (e.g., C1-3 alkyl), aryl (e.g., benzyl), alkoxy (e.g., methoxy), haloalkyl (e.g., trifluoromethyl), or keto group. In the case of aromatic polyhydric alcohols, the aromatic ring may optionally include one or more ring substituents, such as a fluoro, chloro, alkyl (e.g., methyl or ethyl), methoxy, or trifluoromethyl group. If desired, the one or more polyhydric alcohols may further include one or more heteroatoms (e.g., one or more oxygen, sulfur or nitrogen atoms) incorporated in the molecular structure, such as for example an ether group in the case of oxygen atom incorporation or a thioether in the case of sulfur atom incorporation. In some cases, the one or more polyhydric alcohols comprise an aliphatic alcohol (e.g., a cycloaliphatic alcohol).

In some aspects, the one or more polyhydric alcohols may comprise a polyol that comprises a first hydroxyl group separated from a second hydroxyl group by from 2 to 10 carbon atoms, alternatively from 2 to 7 carbon atoms, or alternatively from 3 to 5 carbon atoms. In some aspects, the one or more polyhydric alcohols comprise a polyol that comprises each hydroxyl group of the polyol separated from the other hydroxyl group of the polyol by at least 2 carbon atoms, alternatively at least 3 carbon atoms, or alternatively at least 6 carbon atoms.

Examples of suitable polyhydric alcohols include, without limitations, ethylene glycol, propylene glycol, diethylene glycol, triethylene glycol, tetraethylene glycol, neopentylglycol, trimethylene glycol, glycerol, trimethylolpropane, trimethylolethane, pentaerythritol, pentaerythritol technical grade, dipentaerythritol, tripentaerythritol, 1,4-cyclohexanediol, polyethylene glycol, polyglycerol, polyglycerol technical grade, polyglycerol-3, polyglycerol-4, cyclohexane-1,4-dimethanol, tricyclo[5.2.1.0(2.6)]decane-4,8-dimethanol, hydrogenated bisphenol A (4,4'-Isopropylidenedicyclohexanol), mannitol, sorbitol, xylitol, maltitol, and lactitol. In certain cases, the one or more polyhydric alcohols may be chosen from diethylene glycol, triethylene glycol, glycerol, trimethylolpropane, pentaerythritol, pentaerythritol technical grade, dipentaerythritol, polyglycerol, polyglycerol-4, tricyclo[5.2.1.0(2.6)]decane-4,8-dimethanol, cyclohexane- 1,4-dimethanol, hydrogenated bisphenol A (4,4'-Isopropylidenedicyclohexanol), and combinations thereof.

The oligoesters described herein may optionally further be derived from one or more polycarboxylic acids. The oligoester compositions may be derived from less than Q % by weight of one or more polycarboxylic acids, where Q is defined by the formula below $$10-2\left(\sum_{\substack{polycarboxylic \\ acids}} (XY)\right)$$

where Σ denotes the mathematical summation of the product of X and Y for each of the one or more polycarboxylic acids; X is the carboxylic acid functionality of the polycarboxylic acid, and is an integer ranging from 2 to 4; and Y is the polycarboxylic acid weight fraction of the polycarboxylic acid, and ranges from 0 to 1 with the sum of the weight fractions for the one or more polycarboxylic acids equals 1. In other words the Q value refers to the percentage of the polycarboxylic acids of the total ester composition. For example, the use of 50 wt. % of a dicarboxylic acid and 50 wt. % of a tricarboxylic acid would result in a Q value of 10−2(2×0.5+3×0.5)=10−2(1+1.5)=10−2×2.5=5%. Analogously, the use of only dicarboxylic acid would lead to a Q value of 6%. In some aspects, Q may be defined by the formula below $$8-2\left(\sum_{\substack{polycarboxylic \\ acids}} (XY)\right)$$

where Σ denotes the mathematical summation of the product of X and Y for each of the one or more polycarboxylic acids; X is the carboxylic acid functionality of the polycarboxylic acid, and is an integer ranging from 2 to 4; and Y is the polycarboxylic acid weight fraction of the polycarboxylic acid, and ranges from 0 to 1 with the sum of the weight fractions for the one or more polycarboxylic acids equals 1.

In some aspects, the oligoester may be derived from 0 to 4 wt. %, alternatively from 0 to 3 wt. %, or alternatively from 0 to 2 wt. % polycarboxylic acids (i.e. 2 or more carboxylic acid functionalities), based on the total weight of the components used to form the oligoester composition.

In certain aspects, the oligoester may be derived from 0 to 6 wt. %, alternatively from 0 to 4 wt. %, or alternatively from 0 to 2 wt. % of one or more dicarboxylic acids (i.e., 2 carboxylic acid functionalities) based on the total weight of the components used to form the oligoester composition. In other aspects, the composition may be derived from no polycarboxylic acids.

The one or more polycarboxylic acids may comprise any suitable polycarboxylic acids. In some aspects, the one or more polycarboxylic acids may comprise a dicarboxylic acid. In some aspects, the one or more polycarboxylic acids may comprise a tricarboxylic acid. In some aspects, the one or more polycarboxylic acids may comprise a tetracarboxylic acid. In some cases, the one or more polycarboxylic acids comprise from 2 to 54 carbon atoms (e.g., from 4-35 carbon atoms, from 6-12 carbon atoms).

Polycarboxylic acids may include a combination of linear, branched, cyclic aliphatic (cycloaliphatic), unsaturated, partially unsaturated, heteroaromatic or aromatic chemical moieties, and may optionally include one or more additional functional groups in addition to the two or more carboxylic acid moieties, such as a hydroxyl, alkyl (e.g., C1-3 alkyl), aryl (e.g., benzyl), alkoxy (e.g., methoxy), haloalkyl (e.g., trifluoromethyl), or keto group. In the case of aromatic polycarboxylic acids, the aromatic ring may optionally include one or more ring substituents, such as a fluoro, chloro, alkyl (e.g., methyl or ethyl), methoxy, or trifluoromethyl group. If desired, the one or more polycarboxylic acids may further include one or more heteroatoms (e.g., one or more oxygen, sulfur or nitrogen atoms) incorporated in the molecular structure, such as for example an ether group in the case of oxygen atom incorporation or a thioether in the case of sulfur atom incorporation.

Nonlimiting examples of suitable polycarboxylic acids include adipic acid, 3-methyladipic acid, succinic acid, sebacic acid, 1,4-cyclohexanedicarboxylic acid, 1,3-cyclohexanedicarboxylic acid, 1,2-cyclohexanedicarboxylic acid, rosin dimer, isophthalic acid, terephthalic acid, phthalic acid, TOFA dimer, hydrogenated TOFA dimer, 2-(2-carboxyphenyl)benzoic acid, 2,5-furandicarboxylic acid, camphoric acid, cis-norbornene-endo-2,3-dicarboxylic acid, trimellitic acid, and combinations thereof. UNIDYME™ 30 is an example of a commercially available dimerized TOFA derivative suitable for use in the present disclosure.

The ratio of the weight of one or more polycarboxylic acids to the weight of the rosin and the one or more monocarboxylic acids may be less than 1:20, alternatively less than 1:50, or alternatively less than 1:100. In some cases, the ratio of the weight of the rosin to the weight of the one or more monocarboxylic acids may range from 60:40 to 10:85. The ratio of the weight of the rosin and the one or more monocarboxylic acids to the weight of one or more polycarboxylic acids may be at least 6.5:1, or at least 15:1. In certain cases, the oligoester composition may be derived from 30 wt. % to 75 wt. %, alternatively by weight rosin, alternatively from 25 wt. % to 60 wt. % by weight one or more monocarboxylic acids, alternatively from 5 wt. % to 18 wt. % by weight one or more polyhydric alcohols; or alternatively from 0 wt. % to less than 4 wt. % by weight one or more polycarboxylic acids.

In one aspect, the oligoester composition may be derived from 5 wt. % to 75 wt. % by weight rosin, from 15 wt. % to 85 wt. % one or more monocarboxylic acids, or alternatively from 7 wt. % to 40 wt. % by weight one or more polyhydric alcohols, from 0 wt. % to less than 4 wt. % by weight one or more polycarboxylic acids. In one aspect, the oligoester composition may be derived from 15 wt. % to 75 wt. % by weight rosin, from 36 wt. % to 80 wt. % by weight one or more monocarboxylic acids, from 9 wt. % to 35 wt. % by weight one or more polyhydric alcohols, and from 0 wt. % to less than 4 wt. % by weight one or more polycarboxylic acids. In one aspect, the oligoester composition may be derived from 30 wt. % to 75 wt. % by weight rosin, from 25 wt. % to 60 wt. % by weight one or more monocarboxylic acids, from 3% wt. % to 18 wt. % by weight one or more polyhydric alcohols, and from 0 wt. % to less than 4 wt. % by weight one or more polycarboxylic acids. In one aspect, the oligoester composition may be derived from 5 wt. % to 75 wt. % by weight rosin, from 15 wt. % to 85 wt. % by weight one or more monocarboxylic acids, from 7 wt. % to 40 wt. % by weight one or more polyhydric alcohols, or and from 0 wt. % to less than 6 wt. % by weight one or more dicarboxylic acids, wherein the dicarboxylic acid contains from 2 to 35 carbon atoms.

The oligoester composition may have a weight average molecular weight (MW), as determined using gel permeation chromatography (GPC) as described in ASTM D5296-

05, from 500 g/mol to 8000 g/mol, alternatively from 700 g/mol to 8000 g/mol, alternatively from 1000 g/mol to 5000 g/mol, or alternatively from 1100 g/mol to 3000 g/mol. In certain aspects, less than 35 wt. %, alternatively less than 20 wt. %, or alternatively less than 13 wt. % by weight of the oligoester composition has a molecular weight of less than 1,000 g/mol, as determined by GPC.

In some aspects, the oligoester may have a softening point of between 20° C. and 150° C., alternatively between 60° C. and 130° C., or alternatively between 80° C. and 110° C. as measured using the Ring and Ball method. In certain aspects, the oligoester may be a liquid (e.g., a viscous liquid) at 20° C. and 1 atm.

Oligoester compositions may be also characterized by their glass transition temperature (Tg). Dynamic Mechanical Analysis (DMA) and Differential Scanning Calorimetry (DSC) may be used to determine Tg values. In general the Tg value of the oligoesters may be approximately 50° C. lower than the softening point value of the oligoester.

In some aspects, the oligoester composition may have a Tg between −80° C. and 100° C., alternatively between −60° C. and 80° C., alternatively between −50° C. and 40° C., or alternatively less than about −20° C. as measured by DSC.

The oligoester composition may have an improved Gardner color. In some aspects, the oligoester has a neat Gardner color, as determined according to the method described in ASTM D1544-04 (2010), of 8 or less, alternatively 6 or less, or alternatively 4 or less.

The oligoester composition may exhibit improved color stability. In some aspects, the oligoester composition may exhibit less than a 10% change, alternatively less than a 8% change, or alternatively less than a 5% change in neat Gardner color, as determined according to the method described in ASTM D1544-04 (2010), when heated to a temperature of 160° C. for a period of three hours. In certain aspects, the neat Gardner color of the oligoester composition, as determined according to the method described in ASTM D1544-04 (2010), remains substantially unchanged (i.e., exhibits less than a 0.5% change in neat Gardner color) when the oligoester composition is heated to a temperature of 160° C. for a period of three hours.

The oligoester composition may also exhibit improved oxidative stability. For example, in some aspects, when no antioxidant is present in combination with the oligoester composition, the oligoester composition may exhibit an oxidative-induction onset time at 110° C., as measured using the methods specified in ASTM D5483-05(2010), of between 30 and 200 minutes, or alternatively between 70 and 150 minutes.

Optionally, the oligoester composition may have a low hydroxyl number. In some aspects, the oligoester composition has a hydroxyl number, as measured using a modified version of the standard method provided in DIN 53240-2 (different solvent tetrahydrofuran was applied), of less than 200 mg KOH/gram, alternatively less than 30 mg KOH/gram, alternatively less than 20 mg KOH/gram, or alternatively less than 6 mg KOH/gram. The hydroxyl number is expressed as mg KOH per gram oligoester sample.

Optionally, the oligoester composition may have a low acid number. In some aspects, the oligoester composition has an acid number, as determined according to the method described in ASTM D465-05 (2010), of 30 mg KOH/gram or less, alternatively 15 mg KOH/gram or less, or alternatively 6 mg KOH/gram or less. The acid number is expressed as mg KOH per gram oligoester sample.

Also provided are polymeric compositions comprising a polymer and an oligoester composition of the type described herein. The polymer may be any suitable polymer. The polymer may be a homopolymer or a copolymer (e.g., a random copolymer or a block copolymer) derived from one or more monomers (e.g., one or more ethylenically-unsaturated monomers). The polymer may be a branched polymer or copolymer. For example, the polymer may be a graft copolymer having a polymeric backbone and a plurality of polymeric side chains grafted to the polymeric backbone. In some cases, the polymer may be a graft copolymer having a backbone of a first chemical composition and a plurality of polymeric side chains which are structurally distinct from the polymeric backbone (e.g., having a different chemical composition than the polymeric backbone) grafted to the polymeric backbone.

The polymer may be, for example, a polyacrylate, a polyolefin, a polyamide, a polyvinyl ether, a polyurethane, a polyester, a polyvinyl ester, a copolymer thereof, or a blend thereof. In some cases, the polymer may be derived from one or more ethylenically-unsaturated monomers. In this context, a polymer derived from an ethylenically-unsaturated monomer includes polymers derived, at least in part, from polymerization of the ethylenically-unsaturated monomer. For example, a polymer derived from an ethylenically-unsaturated monomers may be obtained by, for example, radical polymerization of a monomer mixture comprising the ethylenically-unsaturated monomer. A polymer derived from an ethylenically-unsaturated monomer may be said to contain monomer units obtained by polymerization (e.g., radical polymerization) of the ethylenically-unsaturated monomer. Polymeric compositions may also comprise a rosin ester described herein and a blend of two or more polymers derived from one or more ethylenically-unsaturated monomers. In these cases, the blend of two or more polymers may be, for example, a blend of two or more polymers having different chemical compositions (e.g., a blend of poly(ethylene-co-vinyl acetate) and polyvinyl acetate; or a blend of two poly(ethylene-co-vinyl acetates) derived from different weight percent of ethylene and vinyl acetate monomers).

Nonlimiting examples of suitable ethylenically-unsaturated monomers include (meth)acrylate monomers, vinyl aromatic monomers (e.g., styrene), vinyl esters of a carboxylic acids, (meth)acrylonitriles, vinyl halides, vinyl ethers, (meth)acrylamides and (meth)acrylamide derivatives, ethylenically unsaturated aliphatic monomers (e.g., ethylene, butylene, butadiene), and combinations thereof. As used herein, the term "(meth)acrylate monomer" includes acrylate, methacrylate, diacrylate, and dimethacrylate monomers. Similarly, the term "(meth)acrylonitrile" includes acrylonitrile, methacrylonitrile, etc. and the term "(meth)acrylamide" includes acrylamide, methacrylamide, etc.

Suitable (meth)acrylate monomers include, without limitation, esters of α,β-monoethylenically unsaturated monocarboxylic and dicarboxylic acids having 3 to 6 carbon atoms with alkanols having 1 to 20 carbon atoms (e.g., esters of acrylic acid, methacrylic acid, maleic acid, fumaric acid, or itaconic acid, with C1-C20, C1-C12, C1-C8, or C1-C4 alkanols). Exemplary (meth)acrylate monomers include, but are not limited to, methyl acrylate, methyl (meth)acrylate, ethyl acrylate, ethyl (meth)acrylate, butyl acrylate, butyl (meth)acrylate, isobutyl (meth)acrylate, n-hexyl (meth)acrylate, ethylhexyl (meth)acrylate, n-heptyl (meth)acrylate, ethyl (meth)acrylate, 2-methylheptyl (meth)acrylate, octyl (meth)acrylate, isooctyl (meth)acrylate, n-nonyl (meth)acrylate, isononyl (meth)acrylate, n-decyl (meth)acrylate, isodecyl (meth)acrylate, dodecyl (meth)acrylate, lauryl (meth)acrylate, tridecyl (meth)acrylate, stearyl (meth)acrylate, glycidyl (meth)acrylate, alkyl crotonates, vinyl acetate, di-n-butyl maleate, di-octylmaleate, acetoacetoxyethyl (meth)acrylate, acetoacetoxypropyl (meth)acrylate, hydroxyethyl (meth)acrylate, allyl (meth)acrylate, tetrahydrofurfuryl (meth)acrylate, cyclohexyl (meth)acrylate, 2-ethoxyethyl (meth)acrylate, 2-methoxy (meth)acrylate, 2-(2-ethoxyethoxy)ethyl (meth)acrylate, 2-ethylhexyl (meth)acrylate, 2-propylheptyl (meth)acrylate, 2-phenoxyethyl (meth)acrylate, isobornyl (meth)acrylate, caprolactone (meth)acrylate, polypropyleneglycol mono(meth)acrylate, polyethyleneglycol (meth)acrylate, benzyl (meth)acrylate, 2,3-di(acetoacetoxy)propyl (meth)acrylate, hydroxypropyl (meth)acrylate, methylpolyglycol (meth)acrylate, 3,4-epoxycyclohexylmethyl (meth)acrylate, 1,6 hexanediol di(meth)acrylate, 1,4 butanediol di(meth)acrylate and combinations thereof.

Suitable vinyl aromatic compounds include without limitation styrene, α- and p-methylstyrene, α-butylstyrene, 4-n-butylstyrene, 4-n-decylstyrene, vinyltoluene, and combinations thereof. Suitable vinyl esters of carboxylic acids include without limitation vinyl esters of carboxylic acids comprising up to 20 carbon atoms, such as vinyl laurate, vinyl stearate, vinyl propionate, versatic acid vinyl esters, and combinations thereof. Suitable vinyl halides may include without limitation ethylenically unsaturated compounds substituted by chlorine, fluorine or bromine, such as vinyl chloride and vinylidene chloride. Suitable vinyl ethers may include, without limitation, vinyl ethers of alcohols comprising 1 to 4 carbon atoms, such as vinyl methyl ether or vinyl isobutyl ether. Aliphatic hydrocarbons having 2 to 8 carbon atoms and one or two double bonds may include, without limitation, hydrocarbons having 2 to 8 carbon atoms and one olefinic double bond, such as ethylene, as well as hydrocarbons having 4 to 8 carbon atoms and two olefinic double bonds, such as butadiene, isoprene, and chloroprene.

In some aspects, the polymer derived from one or more ethylenically-unsaturated monomers comprises a copolymer of ethylene and n-butyl acrylate. In some aspects, the polymer derived from one or more ethylenically-unsaturated monomers comprises a copolymer of styrene and one or more of isoprene and butadiene. In certain aspects, the polymer derived from one or more ethylenically-unsaturated monomers comprises a metallocene-catalyzed polyolefin. Nonlimiting examples of suitable metallocene-catalyzed polyolefins include metallocene polyethylenes and metallocene polyethylene copolymers, which are commercially available, for example, from Exxon Mobil Corporation (under the trade name EXACT®) and Dow Chemical Company (under the trade name AFFINITY®).

In certain aspects, the polymer derived from one or more ethylenically-unsaturated monomers comprises a polymer derived from vinyl acetate. Polymers derived from vinyl acetate include polymers derived, at least in part, from polymerization of vinyl acetate monomers. For example, the polymer derived from vinyl acetate may be a homopolymer of vinyl acetate (i.e., polyvinyl acetate; PVA). The polymer derived from vinyl acetate may also be a copolymer of vinyl acetate and one or more additional ethylenically-unsaturated monomers (e.g., poly(ethylene-co-vinyl acetate), EVA). In these aspects, the polymer derived from vinyl acetate may be derived from varying amounts of vinyl acetate, so as to provide a polymer having the chemical and physical properties suitable for a particular application.

In some aspects, the polymer derived from vinyl acetate is derived from between 5 wt. % and 95%, alternatively between 8 wt. % and 45 wt. %, alternatively between 18 wt. % and 38 wt. %, or alternatively 28 wt. % by weight vinyl acetate, based on the total weight of all of the monomers polymerized to form the polymer.

In the case of copolymers derived from vinyl acetate and one or more ethylenically-unsaturated monomers, any suitable ethylenically-unsaturated monomers may be incorporated in the copolymer, so as to provide a copolymer having the chemical and physical properties desired for a particular application. By way of example, and without limitation, suitable ethylenically-unsaturated monomers which may be incorporated into the copolymers include those described above, including (meth)acrylate monomers, vinyl aromatic monomers (e.g., styrene), vinyl esters of a carboxylic acids, (meth)acrylonitriles, vinyl halides, vinyl ethers, (meth)acrylamides and (meth)acrylamide derivatives, ethylenically unsaturated aliphatic monomers (e.g., ethylene, butylene, butadiene), and combinations thereof.

In certain aspects, the polymer is poly(ethylene-co-vinyl acetate) (EVA). EVA is a copolymer derived from ethylene and vinyl acetate. EVA is widely used in a variety of applications, including as a copolymer in hot-melt adhesives, in road marking and pavement marking applications, in biomedical applications (e.g., as a matrix for controlled drug delivery), as an additive in plastic films, and as a foam in a variety of consumer products. Optionally, the EVA copolymer may be grafted with suitable olefinic monomers, such as butadiene, to obtain copolymers having the particular chemical and physical properties required for a particular application. See, for example, U.S. Pat. No. 3,959,410 to DiRossi and U.S. Pat. No. 5,036,129 to Atwell, et al.

In certain aspects, the polymer is EVA derived from 9 wt. % to less than 45 wt. % by weight vinyl acetate, based on the total weight of all of the monomers polymerized to form the polymer. In one aspect, the polymer derived from vinyl acetate is EVA derived from 26 wt. % to 28 wt. % vinyl acetate and from 72 wt. % to 74 wt. % ethylene, based on the total weight of all of the monomers polymerized to form the polymer.

In some aspects, the polymer has a melting temperature, as measured by differential scanning calorimetry (DSC) using the standard method described in ISO 11357-3:2011, of between 20° C. and 150° C., alternatively between 30° C. and 100° C., or alternatively between 40° C. and 80° C.

The oligoester composition may be present in the polymeric compositions in varying amounts, depending upon the desired properties of the composition. In some aspects, the oligoester composition comprises between 2 wt. % and 95 wt. %, alternatively between 5 wt % and 90 wt. %, alternatively between 20 wt % and 80%, or alternatively between 30 wt % and 70 wt. % by weight of the polymeric composition.

Similarly, the polymer may be present in the polymeric compositions in varying amounts, depending upon the desired properties of the composition. In some aspects, the polymer comprises in between 5 wt. % and 95 wt. %, alternatively between 10 wt. % and 90 wt. %, alternatively between 20 wt. % and 80 wt. %, or alternatively between 30 wt. % and 70 wt. % by weight of the composition.

In some cases, the polymeric composition may be an adhesive formulation (e.g., hot-melt adhesive formulation, a pressure sensitive adhesive (PSA), or a water-based adhesive), an ink formulation, a coating formulation, a textile formulation, a plasticized polymer formulation (e.g., a plastic), a rubber formulation (e.g., a tire or tire tread), a sealant formulation, an asphalt formulation, a roof coating formulation, a bitumen formulation, or a pavement marking formulation (e.g., a thermoplastic road marking formulation).

In certain aspects, the composition is a hot-melt adhesive. Hot-melt adhesives may be used, for example, in papers and packaging, in conjunction with non-woven materials, in adhesive tapes, in electrical and electronic bonding, in general wood assembly, and in other industrial assembly. In these aspects, the oligoester composition may function as all or a portion of the tackifier component in a traditional hot-melt adhesive formulation. The polymer (e.g., a polymer derived from one or more ethylenically-unsaturated monomers), the oligoester composition, and one or more additional components, may be present in amounts effective to provide a hot-melt adhesive having the characteristics required for a particular application. For example, the polymer (e.g., a polymer derived from one or more ethylenically-unsaturated monomers), may be from 10 wt. % to 90 wt. %, alternatively from 20 wt. % to 60%, or alternatively from 25 wt. % to 50 wt. % by weight of the hot-melt adhesive composition The oligoester composition may be from 5 wt. % to 70 wt. %, alternatively from 10 wt. % to 55 wt. %, or alternatively from 25 wt. % to 50 wt. % of the hot-melt adhesive composition The Melt Flow Index (MFI) of the polymer in the hot-melt adhesive (e.g., the MFI of the EVA, or the MFI of the copolymer of ethylene and n-butyl acrylate) may vary depending on a number of factors, including the desired hot-melt application temperature. For example, in some cases, the polymer may have a relatively high MFI value in the cases of hot-melt adhesives designed to be applied at relatively low application temperatures.

The hot-melt adhesive may further include one or more additional components, including additional tackifiers, waxes, stabilizers (e.g., antioxidants and UV stabilizers), plasticizers (e.g., benzoates and phthalates), paraffin oils, nucleating agents, optical brighteners, pigments dyes, glitter, biocides, flame retardants, anti-static agents, anti-slip agents, anti-blocking agents, lubricants, and fillers. In some aspects, the hot-melt adhesive further comprises a wax. Suitable waxes include paraffin-based waxes and synthetic Fischer-Tropsch waxes. The waxes may be from 10 wt. % to 40 wt. %, or alternatively from 15 wt % to 30 wt. % by weight of the hot-melt adhesive composition, based on the total weight of the hot melt adhesive composition.

In certain aspects, the composition is a hot-melt adhesive and the polymer may be chosen from a poly(ethylene-co-vinyl acetate), an ethylene n-butylacrylate, an ethylene ethylhexyl acrylate, an ethylene-ethyl acrylate, an ethylene-methyl acrylate, and combinations thereof. In certain aspects, the polymer may be EVA, and the EVA may be derived from 10 wt. % to 40 wt. % vinyl acetate, based on the total weight of all of the monomers polymerized to form the EVA (e.g., from 17 wt. % to 34 wt. % vinyl acetate). In some of these aspects, the oligoester composition may have a glass transition temperature (Tg) of greater than 20° C.

In some aspects, the polymeric composition may be a pressure sensitive adhesive (PSA), such as a PSA comprising a styrene block copolymer. PSAs may be used, for example, in safety labels for power equipment, inventory labels, reflective labels, instructional labels, foil tape for duct work, automotive interior trim assembly, and sound/vibration damping films, architectural films, surface protection films, masking tapes, bookmark and note papers, price marking labels, promotional graphics materials and films, personal care, and for skin contact applications such as medical and wound care dressings, electrodes, athletic tape, analgesic and transdermal drug patches. In certain aspects, the PSA may comprise from 5 wt. % to 60 wt. %, based on the total weight of the PSA, of a polymer; and from 5 wt % to 90 wt. %, based on the total weight of the PSA, of the oligoester composition. In certain aspects, the PSA may comprise from 10 wt. % to 50 wt. %, based on the total weight of the PSA, of a polymer; from 5 wt. % to 70 wt. %, based on the total weight of the PSA, of the oligoester composition; from 5 wt. % to 50 wt. %, based on the total weight of the PSA, of a tackifier having a glass transition temperature higher than 20° C.; and from 0% to 25% by weight, based on the total weight of the PSA, of an oil. In certain aspects, the PSA may comprise from 5 wt. % t to 60 wt. %, based on the total weight of the PSA, of a styrene-containing triblock copolymer; from 0 wt. % to 20 wt. %, based on the total weight of the PSA, of a styrene-containing diblock copolymer; from 5 wt. % to 50 wt. %, based on the total weight of the PSA, of the oligoester composition, wherein the oligoester composition has a glass transition temperature of less than 0° C.; from 5 wt. % to 50 wt. %, based on the total weight of the PSA, of a tackifier having a glass transition temperature higher than 20° C.; and from 0 wt. % to 25 wt. %, based on the total weight of the PSA, of an oil. In some of these aspects, the oligoester composition may have a glass transition temperature (Tg) of less than 0° C.

Pressure sensitive adhesives are viscoelastic materials. They combine simultaneously a liquid like character to enable them to flow and form good molecular contact upon application of light pressure in a short contact time as well as solid like character to resist to an applied stress after adhesive bond formation. Three main properties for pressure sensitive adhesives are tack, shear and peel resistance. Peel adhesion is defined as the force required to remove pressure sensitive coated material, which has been applied to a standard test plate under specified conditions from the plate at a specified angle and speed. The 'loop' tack value of a pressure sensitive material is expressed as the force required to separate, at a specified speed, a loop of material (adhesive outermost) which has been brought into contact with a specified area of a standard surface. Resistance to shear from a standard surface is defined as the time required for a standard area of pressure sensitive coated material to slide from a standard flat surface in a direction parallel to the surface.

Viscoelastic profiles of adhesive blends may depend heavily on variations in the relative amounts of the ingredients and their respective physicochemical properties as well as the resulting compatibility. Dynamic mechanical analysis (DMA) is an important technology to assess the viscoelastic properties and degree of compatibility of adhesives, including pressure sensitive adhesives. A compatible blend made from a polymer having a low Tg value and another material with a different Tg value will generally result in a blend which exhibits an interjacent Tg value. The Flory-Fox equation may be applied to calculate an estimate of the resulting blend Tg value if the weight fractions w1 and w2 of the blend components are known.

DMA profiles (elastic modulus G' and loss modulus G" as the dynamic moduli) may be determined using commercially available equipment, such as an ARES G2 mechanical spectrometer, over a wide temperature range, e.g. ranging from −60° C. up to 140° C. at a fixed frequency (e.g. 10 rad/s).

The loss tangent (tan $\delta$) value may be calculated as follows: tan $\delta$=G"/G' (i.e. the ratio of loss modulus to storage modulus), wherein $\delta$ represents the phase angle, or phase shift caused by DMA applied sinusoidal strain. $\delta$: 0°<$\delta$<90°.

The temperature at which the maximum loss tangent (tan $\delta$) peak value occurs may be determined by DMA and provides an estimation of Tg. It may make sense for comparative purposes to adjust the temperature at which the maximum loss tangent (tan δ) peak occurs for two different adhesive blends to the same temperature value by adjusting the blend ratio of their components as an enabler for meaningful property comparisons. For example, for pressure sensitive adhesives such meaningful properties may be tack, peel and shear resistance, including the shear adhesion failure temperature (SAFT) value. It is known that it may be difficult to simultaneously achieve high tack, peel and shear performances in an adhesive pressure sensitive adhesive formulation. There exists still a commercial need for pressure sensitive adhesives which provide an increased shear performance or higher SAFT temperature while maintaining their tack and peel performance levels.

In certain aspects, the composition may be a PSA comprising a polymer and an oligoester, wherein the composition exhibits a loop tack adhesion on a stainless steel surface of at least 25 Newton/25 mm, a 180° peel adhesion on a stainless steel surface after 20 minutes of at least 25 Newton/25 mm, a shear adhesion time of at least 500 minutes (e.g., at least 2000 minutes, at least 3000 minutes, or at least 5000 minutes), a SAFT failure temperature of at least 50° C. (e.g., at least 55° C.), or a combination thereof.

In certain aspects, the composition is a thermoplastic road marking formulation. The thermoplastic road marking formulation may include from 5 wt. % to 25 wt. %, or alternatively from 10 wt. % to 20 wt. % of oligoester, based on the total weight of the thermoplastic road marking formulation. The thermoplastic road marking formulation may further include a polymer (e.g., a polymer derived from one or more ethylenically-unsaturated monomers) which may be, for example, from 0.1 wt. % to 1.5 wt. % of the thermoplastic road marking formulation. The thermoplastic road marking formulation may further include a pigment (e.g., from 1 wt. % to 10 wt. % ght titanium dioxide), and glass beads (e.g., from 30 wt. % to 40 wt. %), and a filler (e.g., calcium carbonate which may make up the balance of the composition up to 100 wt. %). The thermoplastic road marking formulation may further include an oil (e.g., from 1 wt. % to 5% wt. % mineral oil), a wax (e.g., from 1 wt. % to 5 wt. % percent paraffin-based wax or synthetic Fischer-Tropsch wax), a stabilizer (e.g., from 0.1 wt. % to 0.5 wt. % stearic acid), and, optionally, additional polymers and/or binders other than the oligoester composition described herein.

In certain aspects, the composition is a rubber formulation, such as a tire or tire tread. Such compositions may comprise one or more rubber polymers and one or more oligoester compositions described herein. In some aspects, the composition may further include one or more fillers.

In some aspects, the one or more oligoester compositions may be present in the rubber formulation in an amount of 1 to 80 part by weight, alternatively 3 to 60, or alternatively 5 to 40 based on 100 parts by weight of the rubber polymer.

In some aspects, the one or more oligoester compositions in the rubber formulation may have a Tg of at least −80° C., alternatively of at least −60° C., or alternatively of at least −30° C. as measured by DSC.

The rubber polymer may be any suitable rubber polymer or combination of rubber polymers (including natural rubber and its various raw and reclaimed forms as well as various synthetic rubber polymers, and any combinations thereof), depending on the desired end use of the rubber formulation. Representative synthetic rubber polymers are the homopolymerization products of butadiene and its homologues and derivatives, for example, methylbutadiene, dimethylbutadiene and pentadiene, as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. It should be understood that any of the rubbers may be end-modified. Such an end-modifying group may be a carboxyl group, an amino group, a hydroxyl group, an alkoxyl group or a silanol group (—SiOH), for example. Meanwhile, a rubber may contain a modifying group inside the rubber chain. Such a modifying group may be an epoxy group or a ketone group, for example. Any of these rubbers may be used either in a single form or an arbitrarily blended form. In certain aspects, the rubber formulation may include one or more diene rubber or non-diene polymers. Optionally, the formulation may further include any suitable additives and fillers as may be desired. Thus, it is possible to blend various additives generally used in tire rubber compositions, including, vulcanizing agents, vulcanization accelerators, antioxidants, plasticizers, coupling agents, reinforcing agents, viscosifiers, colorants, softeners, fillers, and the like with the rubber formulation.

In certain aspects, the rubber formulation may be a tire tread composition. The tire tread composition may exhibit improved wet grip as evidenced by an increased tan δ at 0° C. relative to the same composition wherein the one or more oligoesters are replaced by a conventional extender, such as treated distillate aromatic extract (TDAE). For example, in some aspects, the tire tread composition may exhibit improved wet grip as evidenced by at least a 5% increase (e.g., at least a 10% increase, at least a 15% increase, or at least a 20% increase) in tan δ at 0° C. relative to the same composition wherein the oligoester composition is replaced by treated distillate aromatic extract (TDAE).

In some aspects, the polymeric composition may be a dispersion (e.g., an aqueous dispersion). In some aspects, the polymeric composition may be an adhesive dispersion. In certain aspects, the dispersion may comprise from 10 wt. % to 90 wt. % polymer (e.g., polyacrylate polymer or copolymer); and from 5% wt. % to 60 wt. % by weight of the oligoester composition. The dispersion may have a solids content of from 35 wt. % to 80 wt. %. The dispersion may comprise particles having a median particle size of from 5 nm to 5000 nm (e.g., from 5 nm to 1500 nm, or from 5 nm to 500 nm), as determined by scanning electron microscopy.

In some aspects, by incorporating a rosin ester described herein into the polymeric composition, the polymeric composition may exhibit improved thermal stability, including improved viscosity stability on aging at elevated temperatures (thermal aging), improved color stability on thermal aging, or combinations thereof.

In some aspects, the polymeric compositions provided herein exhibit less than a 10% change in viscosity upon incubation at 177° C. for 96 hours, when analyzed using the modified ASTM D4499-07 method described below (e.g., less than an 8% change in viscosity, or less than a 4% change in viscosity,). In some aspects, the composition exhibits substantially no change in viscosity (i.e., less than a 0.5% change in viscosity) upon incubation at 177° C. for 96 hours.

In some aspects, the polymeric compositions provided herein exhibit color stability upon thermal aging. In certain cases, the polymeric compositions provided herein exhibit a change of 5 or less Gardner color units when heated to a temperature of 177° C. for a period of 96 hours (e.g., 3.0 or less, or 1 or less).

The polymeric compositions provided herein may be used in a variety of applications, including as adhesives (e.g., hot-melt adhesives), inks, coatings, rubbers (e.g., tires and tire treads), sealants, plasticizers, asphalt, and thermoplastic road markings and pavement markings. In some aspects, the compositions are hot-melt adhesives used, for example, in conjunction with papers and packaging (e.g., case and carton manufacture, such as to adhere surfaces of corrugated fiberboard boxes and paperboard cartons during assembly and/or packaging, to prepare self-adhesive labels and/or envelopes, to apply labels to packaging, to seal envelopes or packaging, or in other applications such as bookbinding), in conjunction with non-woven materials (e.g., to adhere nonwoven material with a backsheet during the construction of disposable diapers), in adhesive tapes, in apparel (e.g., in the assembly of footware, or in the assembly of multi-wall and specialty handbags), in electrical and electronic bonding (e.g., to affix parts or wires in electronic devices), in general wood assembly (e.g., in furniture assembly, or in the assembly of doors and mill work), and in other industrial assembly (e.g., in the assembly of appliances). The oligoesters described herein may also be used in a variety of additional applications, including as a softener and plasticizer in chewing gum bases, as a weighting and clouding agent in beverages (e.g., citrus flavored beverages), as a surfactant, surface activity modulator, or dispersing agent, as an additive in waxes and wax-based polishes, as a modifier in skin products and cosmetic formulations (e.g., mascara), in the electrical industry as insulators, as drying oils in making paints and other wood treatment products, in treating the hulls of wooden boats, in soaps, in candles, as a lubricant in automotive applications and engine lubricants, to make biodiesel, to produce biodegradable hydraulic fluids, in metal working and other industrial applications, as a phase change material, and as a curing agent in concrete.

The property of reducing friction is known as lubricity. Lubricants may reduce the heat of friction between surfaces in mutual contact when the surfaces move. It may also have the function of transmitting forces, transporting foreign particles, or heating or cooling the surfaces. The oligoesters described herein may be employed as a lubricant.

Phase change materials (PCMs) are used for energy storage applications. PCMs may for example be used in latent heat thermal storage, systems for heat pumps, solar engineering, and spacecraft thermal control applications and for heating and cooling applications for buildings. The oligoester compositions described herein may be employed as a phase change material.

The oligoester compositions described herein may also be employed as a plasticizer. Plasticizers are additives which may be used to improve properties and processing characteristics of polymers and other materials (e.g., by increasing the fluidity or plasticity of the materials). Plasticizers generally exhibit a low glass transition temperature, and may be used to decrease the glass transition temperature, melt viscosity, elastic modulus, and other viscoelastic properties of compatible polymers. In this sense, plasticizers may be regarded as polymer rheology modifiers. More detailed information about plasticizers may be found in G. Wypych. Handbook of Plasticizers, 2nd Edition, 2012, ChemTec Publishing.

Currently, there is a need for plasticizers that have higher molecular weights than existing low molecular weight plasticizers, such as phthalates (e.g., a higher molecular weight that diisononyl phthalate, di-2-ethylhexyl phthalate, or dioctyl phthalate). A trend is to reduce the use of phthalates as plasticizers because of their toxicity and the evidence of pervasive human and environmental exposure to them. Further, there is also an interest in plasticizers that are are derived from renewable feedstock (as opposed to a petroleum-based feedstock). A relatively high molecular weight may be achieved by applying polyfunctional reactants like polycarboxylic acids and polyols. The oligoester compositions of the present disclosure may have sufficiently high molecular weights to exhibit a low volatility and low migration properties. A mass loss rate determination by applying for example a moisture analyzer at an elevated temperature (e.g. 160° C.) may be applied to assess the degree of volatility of the oligoester compositions of the present disclosure and polymer blends thereof.

The oligoester composition may exhibit a mass loss of less than 10 wt. % at 160° C., or less than 4 wt. % at 160° C. over a time period of 4 hours, or less than 2.5 wt. % at 160° C.

In certain aspects when employed as a plasticizer, the oligoester may be derived from reactants that are listed in the Plastics Regulation (EU) No. 10/2011 on plastic materials and articles intended to come into contact with food. In certain aspects, the oligoester may be derived from a majority (by weight) of materials that are derived from a renewable feedstock. As such, the oligoester may have a high biorenewable content. Examples of materials that are derived from a renewable feedstock include vegetable oils, animal oils and fats, and deodorized or hydrogenated oils and fats as well as fatty acids and hydrogenated fatty acids derived therefrom, tall oil fatty acid, glycerol, succinic acid, and rosin.

Plasticizers may make an important contribution to improve the performance in a variety of industrial applications wherein polymers, plastics or other macromolecular chemical entities, or mixtures or blends thereof, are applied such as in adhesives, including water-based adhesives applications and adhesive tapes, coatings, roofing, road pavement, asphalt, bitumen and road marking formulations, films, textiles, automotive, paints, flooring, sealants, polymer emulsions, conveyor belts, gaskets, hoses, and pharmaceutical applications. Oligoesters may be employed as plasticizers in a variety of synthetic polymers and biopolymers, such as acrylonitrile-butadiene-styrene, an acrylic polymer, an acrylic copolymer, bromobutyl rubber, butyl terpolymer, cellulose acetate, cellulose butyrate, cellulose propionate, cellulose nitrate, chlorinated polyvinyl chloride, polyvinyl chloride, chlorosulphonated polyethylene, cyanoacrylate, styrenic block copolymer consisting of polystyrene blocks and rubber blocks wherein the rubber blocks consist of polybutadiene, polyisoprene or hydrogenated versions thereof (SEBS and SEPS triblock copolymers), caprolactone-styrene diblock copolymers, urethane acrylic copolymer, urethanes, polyolefin, ethylene-propylene-diene copolymer, epoxy resin, ethylene-vinyl acetate copolymer, an ionomer, nitrile rubber, polyacrylonitrile, polyamide, polyamine, polyaniline, polybutadiene, polybutylene, poly(butyl methacrylate), polycarbonate, polyester, polyetherimide, polyethylacrylate, polyethylene, poly(ethylene)oxide, polyisobutylene, polyisoprene, polyimide, polylactide, polymethylmethacrylate, polypropylene, poly(N-vinylcarbazole), poly(N-vinyl pyrrolidone), polyphenylene ether, polystyrene, polysulfone, polysulfide, polyvinylacetate, polyvinylalcohol, polyvinylbutyral, polyvinylchloride, polyvinylidinefluoride, polyvinylidinechloride, polyurethane, protein, natural rubber, silicone, styrene-butadiene rubber, styrene-butadiene-styrene, styrene-isoprene-styrene and starch. Accordingly, also provided are polymeric compositions comprising one or more of these polymers in combination with an oligoester described herein. SEBS and SEPS are second generation styrenic block copolymers with a hydrogenated midblock of styrene-ethylene/butylene-styrene (SEBS) or styrene-ethylene/propylene-styrene (SEPS), also known as Kraton G polymers.

The composition may comprise a second plasticizer comprising phthalate ester, azelate ester, 1,2-cyclohexane dicarboxylate ester, trimellitate ester, succinate ester, glutarate ester, adipate ester, sebacate ester, citrate ester, ester, terephthalate ester, epoxidized fatty ester, benzoate ester, a phosphate ester, or a combination of any two or more thereof.

Also provided are compositions comprising an oligoester described herein and an oil. Exemplary compositions may include 5 wt. % to 95 wt % (e.g., 20 wt. % to 60 wt. %) of an oligoester described herein and 5 wt. % to 95 wt. % (e.g., 20 wt. % to 70 wt. %) of an oil, such as mineral oil or polybutene oil.

Also provided are methods for preparing the oligoester compositions of the type described herein. Various methods may be used to prepare oligoester compositions. For example, the oligoester compositions described herein may be prepared by an esterification process, wherein the carboxylic acid-containing components of the oligoester are esterified with one or more polyhydric alcohols. An esterification reaction of this type is an equilibrium reaction. The removal of the water formed as the reaction proceeds may shift the reaction equilibrium to favor product formation and thereby drive the reaction towards completion. Accordingly, in some aspects, methods for preparing oligoesters may comprise esterifying a mixture comprising one or more rosins, one or more monocarboxylic acids, and optionally one or more polycarboxylic acids with one or more polyhydric alcohols to form the oligoester composition. The esterification step may comprise allowing the mixture and the one or more polyhydric alcohols to react for a period of time and under suitable conditions to form the oligoester. Optionally, the esterifying step may further comprise removing water formed as a byproduct of the esterification reaction. Optionally, the esterifying step may comprise contacting the mixture and the one or more polyhydric alcohols with an esterification catalyst (e.g., calcium-bis(((3,5-bis(1,1-dimethylethyl)-4-hydroxyphenyl)methyl)-ethylphosphonate)). In other aspects, the esterifying step may comprise contacting the mixture and the one or more polyhydric alcohols in the absence of an esterification catalyst.

The oligoester compositions described herein may also be prepared by a transesterification process, wherein esters of the carboxylic acid-containing components of the oligoester are reacted with one or more polyhydric alcohols. In the case of polyhydric alcohols that have reacted with carboxylic acids, some free unreacted polyhydric alcohol hydroxyl groups may remain which may react in a transesterification reaction with esters and result in an exchange of their alkoxy groups. Such a transesterification reaction is an equilibrium reaction wherein new oligoester compositions may be formed. Accordingly, in some aspects, methods for preparing oligoester compositions may comprise reacting one or more rosin esters having a hydroxyl value greater than zero with one or more esters derived from monocarboxylic acids and optionally one or more polycarboxylic acids. In some aspects, an alcohol or a polyhydric alcohol may be added to trigger or accelerate such a transesterification reaction. Optionally, the transesterifying step may comprise contacting the mixture and the one or more polyhydric alcohols with an esterification catalyst (e.g., calcium-bis (((3,5-bis(1,1-dimethylethyl)-4-hydroxyphenyl)methylphosphonate)).

In other aspects, the transesterifying step may comprise contacting the mixture and the one or more polyhydric alcohols in the absence of an esterification catalyst. Non-limiting examples of esters of the carboxylic acid-containing components of the oligoester which may be used in such a transesterification process are vegetable oils (e.g., triglyceride vegetable oils) and animal fats and oils which include oils such as palm oil, linseed oil, rapeseed oil, sunflower seed oil, olive oil, tung oil, peanut oil, cottonseed oil, palm kernel oil, soybean oil, corn oil, grapeseed oil, hazelnutoil, rice bran oil, safflower oil, sesame oil, butterfat, and coconut oil as well as hydrogenated oils and deodorized oils. Other esters which may be used in such a transesterification process are rosin esters. Such esters may also be applied in the interesterification process described below.

The oligoester compositions described herein may also be prepared by an interesterification process, which is mechanistically related to esterification and transesterification. Interesterification may be carried out by blending different esters and then rearranging the carboxylic acid moieties over the applied polyhydric alcohol backbones in the presence of a catalyst, for example an esterification catalyst. Interesterifications are equilibrium reactions. By way of an example, a rosin ester may be reacted with a triglyceride ester, such as rapeseed oil. Such an interesterification reaction would afford an oligoester wherein the fatty acid moieties in the triglyceride ester are partly substituted by rosin acid moieties, and wherein the rosin acid moieties in the rosin ester are partly substituted by fatty acid moieties.

The oligoester compositions described herein may also be prepared by a combination of the esterification, transesterification, and interesterification methods described above, wherein esters may be reacted which each other in the presence of one or more polyhydric alcohols and one or more monocarboxylic acids and optionally one or more polycarboxylic acids or their partial esters or half esters. An example of partial esters are partial glycerides, which are esters of glycerol with fatty acids where not all the hydroxyl groups are esterified. cis-HOOC—CH=CH—COOCH3 is an example of a half ester derived from maleic acid. Adipic acid monomethyl ester and adipic acid monoethyl ester are examples of half esters derived from adipic acid. As in the methods above, the removal of the water or volatile monoalcohols formed as the reaction proceeds may shift the reaction equilibrium to favor product formation and thereby drive the reaction towards completion.

Reactants based on monocarboxylic acids having a modified carboxyl group or polycarboxylic acids having one or more modified carboxyl groups may be used in place of the monocarboxylic acids or polycarboxylic acids, respectively.

For example, partial esters and half esters, as described above, may be used in place of polycarboxylic acids. Other examples include anhydrides, thioesters and carbonyl chlorides, also called acyl chlorides or acid chlorides, which may be substituted for monocarboxylic acids or polycarboxylic acids. In general these structurally related reactants contain an acyl group that may react with a nucleophile (e.g., the hydroxyl group of a polyhydric alcohol) via a nucleophilic acyl substitution mechanism.

In all four methods, anhydrides may be used as alternative reactants instead of the corresponding carboxylic acids or polycarboxylic acids. For example, succinic anhydride, also called dihydro-2,5-furandione, may be applied instead of succinic acid and palmitic anhydride may be applied instead of palmitic acid. Trimellitic anhydride may be applied instead of trimellitic acid. Analogously, an acid chloride, may be applied as a reactant instead of the corresponding carboxylic acid or may be applied instead of an ester derived from the corresponding carboxylic acid. For example, methyl adipoyl chloride, also called adipic acid monomethyl ester chloride, may be applied as a reactant instead of adipic acid or adipic acid dimethyl ester, adipic acid diethyl ester, adipic acid monomethyl ester, adipic acid monoethyl ester or adipoyl chloride.

Suitable reaction conditions for the esterification, transesterification, and interesterification reactions are described for example, U.S. Pat. No. 5,504,152 to Douglas et al., which is hereby incorporated by reference in its entirety. Suitable reaction conditions may be selected in view of a number of factors, including the nature of the reactants (e.g., the chemical and physical properties of the one or more rosins, the identity of the one or more monocarboxylic acids, the identity of the one or more polycarboxylic acids the identity of the one or more polyhydric alcohols, etc.) and the desired chemical and physical properties of the resultant oligoester.

For example, in some aspects, the methods may comprise esterifying a mixture comprising one or more rosins, one or more monocarboxylic acids, and optionally one or more polycarboxylic acids with one or more polyhydric alcohols to form the oligoester composition. In some aspects, the esterifying step may comprise a thermal reaction of the mixture with the one or more polyhydric alcohols. For example, esterification may comprise contacting the mixture with the one or more polyhydric alcohols at an elevated temperature (e.g., at a temperature from 30° C. to 300° C., or from 150° C. to 285° C.). Optionally, the esterifying step may further comprise removing water formed as a byproduct of the esterification reaction.

Catalysts, co-catalysts, solvents, bleaching agents, stabilizers, and/or antioxidants may be added during the esterification, transesterification, and interesterification reactions described above. Suitable catalysts, co-catalysts, solvents, bleaching agents, stabilizers, and antioxidants are described, for example, in U.S. Pat. Nos. 2,729,660, 3,310,575, 3,423,389, 3,780,013, 4,172,070, 4,548,746, 4,690,783, 4,693,847, 4,725,384, 4,744,925, 4,788,009, 5,021,548, and 5,049,652. In order to drive the reactions to completion, water may be removed from the reactor using standard methods, such as distillation and/or application of a vacuum. Anthraquinone is a co-catalyst which may be present in an amount ranging from 0.001 wt. % to 5 wt. % by weight (e.g., from 0.01 wt. % to 2 wt. %, or from 0.05 wt. % to 0.5 wt. % by weight).

Optionally, an esterification catalyst may be added to the reaction mixture. Suitable esterification catalysts include Lewis and Brønsted-Lowry acids. Nonlimiting examples of suitable esterification catalysts include acidic catalysts such as acetic acid, p-toluenesulfonic acid, methanesulfonic acid, hypophosphorous acid, and sulfuric acid; alkaline metal hydroxides such as calcium hydroxide; metal oxides, such as calcium oxide, magnesium oxide, and aluminum oxide; and other metal salts, such as iron chloride, calcium formate, and calcium phosphonates (e.g., calcium bis-monoethyl(3,5-di-tert-butyl-4-hydroxybenzyl) phosphonate, IRGANOX® 1425). In some aspects, esterification catalyst may be present in an amount ranging from 0.01 wt. % to 15 wt. %, based on the weight of the one or more rosins or rosin esters (e.g., from 0.05 wt. % to 5 wt. %, or from 0.2 wt. % to 1 wt. %).

In certain aspects, the methods of making oligoester compositions may further comprise disproportionating the one or more rosins prior to esterification. Rosin disproportionation converts abietadienoic acid moieties into dehydroabietic acid and dihydroabietic acid moieties. Methods of disproportionation may involve heating rosin, often in the presence of one or more disproportionation agents. Suitable methods for disproportionating rosin are described in, for example, U.S. Pat. Nos. 3,423,389, 4,302,371, and 4,657,703, all of which are incorporated herein by reference.

A variety of suitable disproportionation agents may be used. Nonlimiting examples of suitable disproportionation agents include thiobisnaphthols, including 2,2'thiobisphenols, 3,3'-thiobisphenols, 4,4'-thiobis(resorcinol) and t,t'-thiobis(pyrogallol), 4,4'-15 thiobis(6-t-butyl-m-cresol) and 4/4'-thiobis(6-t-butyl-o-cresol) thiobisnaphthols, 2,2'-thiobisphenols, 3,3'-thio-bis phenols; metals, including palladium, nickel, and platinum; iodine or iodides (e.g., iron iodide); sulfides (e.g., iron sulfide); and combinations thereof. In certain aspects, the rosin is disproportionated using a phenol sulfide type disproportionation agent. Nonlimiting examples of suitable phenol sulfide type disproportionation agents include poly-t-butylphenoldisulfide (commercially available under the trade name ROSINOX® from Arkema, Inc.), 4,4'thiobis(2-t-butyl-5-methylphenol (commercially available under the trade name LOWINOX® TBM-6 from Chemtura), nonylphenol disulfide oligomers (such as those commercially available under the trade name ETHANOX® TM323 from Albemarle Corp.), and amylphenol disulfide polymer (such as those commercially available under the trade name VULTAC® 2 from Sovereign Chemical Co.).

In certain aspects, the rosin is disproportionated prior to esterification. In these aspects, a disproportionated rosin or partly disproportionated rosin may be used as a feedstock for esterification. In some cases, disproportionation or further disproportionation may be conducted during the esterification reaction. For example, disproportionated or partly disproportionated rosin may be generated in situ and esterified thereafter in a one-pot synthesis procedure to a rosin ester.

In some aspects, methods may further comprise hydrogenating the oligoester compositions. Hydrogenation may comprise contacting the oligoester with a hydrogenation catalyst for a period of time and under suitable conditions to form a hydrogenated oligoester. Methods may involve standard methods for hydrogenating rosin esters. Hydrogenation reactions may be carried out using a hydrogenation catalyst, such as a heterogeneous hydrogenation catalyst (e.g., a palladium catalyst, such as Pd supported on carbon (Pd/C), a platinum catalyst, such as PtO2, a nickel catalyst, such as Raney Nickel (Ra-Ni), a rhodium catalyst, or a ruthenium catalyst). In some cases, the hydrogenation catalyst may be present in an amount ranging from 0.25 wt. % to 5 wt. %, based on the total weight of the crude rosin ester. The hydrogen source for the hydrogenation may by hydrogen (H2) or a compound which may generate hydrogen under reaction conditions, such as formic acid, isopropanol, cyclohexene, cyclohexadiene, a diimide, or hydrazine.

The hydrogenation reaction may be performed at an elevated temperature, an elevated pressure, or combinations thereof. For example, the hydrogenation reaction may be performed at a temperature ranging from 120° C. to 300° C. The hydrogenation reaction may be performed at a pressure ranging from 30 to 2000 pounds per square inch (psi), or alternatively from 100 to 1000 psi.

To obtain an oligoester having the desired chemical and physical properties for particular applications, methods of making the oligoesters described herein may optionally further include one or more additional processing steps. In some aspects, the one or more rosins, the oligoester, and/or the hydrogenated oligoester obtained from the hydrogenation reaction may be further processed, for example, to decrease the PAN number of the rosin, the oligoester, and/or the hydrogenated oligoester; to influence the weight ratio of various rosin acids and/or rosin acid esters present in the rosin, the oligoester, and/or the hydrogenated oligoester, to influence the hydroxyl number of the resultant oligoester and/or the hydrogenated oligoester; to influence the acid number of the resultant oligoester and/or the hydrogenated oligoester, or combinations thereof. Suitable additional processing steps may include additional hydrogenation steps, dehydrogenation, disproportionation, dimerization, and fortification. In certain aspects, rosin is processed using one or more of these methods prior to the esterification reaction to improve the chemical and physical properties of the resultant oligoesters. Where chemically permissible, such methods may also be performed in combination with the esterification reaction, following the esterification reaction but prior to the hydrogenation reaction, following the hydrogenation reaction, or combinations thereof to obtain an oligoester and/or a hydrogenated oligoester having the desired chemical and physical properties, as discussed in more detail below.

Optionally, the rosin, oligoester, and/or hydrogenated oligoester may be fortified to improve the chemical and physical properties of the resultant oligoesters. In some aspects, rosin is fortified prior to the esterification reaction to improve the chemical and physical properties of the resultant oligoesters. Fortification of rosin involves the chemical modification of the conjugated double bond system of rosin acids in the rosin, so as to provide a rosin having a lower PAN number and higher molecular weight than the rosin prior to fortification. For example, rosins may be fortified by means of a Diels-Alder or Ene addition reaction of a rosin acid with a dienophile, such as an α,β-unsaturated organic acid or the anhydride of such an acid. Examples of suitable dienophiles include maleic acid, fumaric acid, acrylic acid, esters derived from these acids, and maleic anhydride. Rosins may also be phenolically modified by a reaction with phenol (or bisphenol A) and formaldehyde to improve the chemical and physical properties of the resultant oligoesters.

Optionally, methods may include varying the relative amount of reactants in order to influence the hydroxyl number and acid number of the resultant oligoester. The relative amounts of applied carboxylic acids and polyhydric alcohol may play an important role herein. A stoichiometric excess of carboxylic acid functionality versus polyhydric alcohol functionality will in general lead to oligoester compositions having a low or negligible hydroxyl number. From a chemistry perspective it means that more moles of carboxylic acid moieties (carboxyl moieties), as compared to the number of moles of total polyhydric alcohol hydroxyl moieties, may be applied in the esterification reaction. In some aspects, the reactant mixture prior to the start of the oligoester synthesis may contain a stoichiometric molar ratio of total hydroxyl functionality to total carboxyl functionality of 1.40 or less (e.g., 1.10 or less, 1.05 or less, 1.00 or less, or 0.95 or less, or from 1.00 to 1.15).

Optionally, methods may include one or more process steps to influence the hydroxyl number of the resultant oligoester, to influence the acid number of the resultant oligoester, or combinations thereof. If desired, oligoesters may be chemically modified following esterification (e.g., following the esterification reaction but prior to any hydrogenation reaction, or following the hydrogenation reaction) to provide an oligoester having a low hydroxyl number. This process may involve chemical modification of residual hydroxyl moieties in the oligoester or hydrogenated oligoester following esterification using suitable synthetic methods For example, the oligoester or hydrogenated oligoester may be reacted with an acylating agent (e.g., a carboxylic acid or a derivative thereof, such as an acid anhydride). See, for example, U.S. Pat. No. 4,380,513 to Ruckel. Residual hydroxyl moieties in the oligoester or hydrogenated oligoester may also be reacted with an electrophilic reagent, such as an isocyanate, to produce the corresponding carbamate derivative. See, for example, U.S. Pat. No. 4,377,510 to Ruckel. Other suitable electrophilic reagents which may be used to react residual hydroxyl moieties include alkylating agents (e.g., methylating agents such as dimethylsulphate). If desired, following esterification (e.g., following the esterification reaction but prior to any hydrogenation reaction, or following the hydrogenation reaction), unreacted rosin as well as other volatile components, may be removed from the oligoester or hydrogenated oligoester, for example, by steam sparging, sparging by an inert gas such as nitrogen gas, wiped film evaporation, short path evaporation, and vacuum distillation. By stripping excess rosin (i.e., rosin acids) from the oligoester or hydrogenated oligoester, the acid number of the resultant oligoester may be reduced.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, "alkyl" groups include straight chain and branched alkyl groups having from 1 to about 40 carbon atoms. As employed herein, "alkyl groups" include cycloalkyl groups as defined below. Alkyl groups may be substituted or unsubstituted. Examples of straight chain alkyl groups include, but are not limited to, methyl, ethyl, n-propyl, n-butyl, n-pentyl, n-hexyl, n-heptyl, and n-octyl groups. Nonlimiting examples of branched alkyl groups include, but are not limited to, isopropyl, sec-butyl, t-butyl, neopentyl, and isopentyl groups.

Cycloalkyl groups are cyclic alkyl groups such as, but not limited to, cyclopropyl, cyclobutyl, cyclopentyl, cyclohexyl, cycloheptyl, and cyclooctyl groups.

Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or trisubstituted norbornyl or cycloheptyl groups.

As used herein, "aryl", or "aromatic," groups are cyclic aromatic hydrocarbons that do not contain heteroatoms. Aryl groups include monocyclic, bicyclic, and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups.

The phrase "aryl groups" includes groups containing fused rings, such as fused aromatic-aliphatic ring systems (e.g., indanyl, tetrahydronaphthyl, and the like). Aryl groups may be substituted or unsubstituted.

As used herein, "heteroaryl", or "heteroaromatic," groups are cyclic aromatic hydrocarbons that contain one to two heteroatom selected from N, O and S (e.g., furanyl). Compounds described herein may include isomeric forms including conformational, constitutional, functional, positional isomers, stereoisomers and tautomers.

Aliphatic compounds are hydrocarbons which are non-aromatic and contain no rings, i.e. they may be straight or branched. Aliphatic compounds may be saturated, joined by single bonds (alkanes), or unsaturated, with double bonds (alkenes) or triple bonds (alkynes). Besides hydrogen, other elements may be incorporated in the carbon chain, including oxygen, nitrogen, and sulfur. Cycloaliphatic compounds are hydrocarbons which are non-aromatic and contain one or more rings. Cycloaliphatic compounds suitable for use in the present disclosure include without limitation one to six rings in their molecular structure, and are referred to as monocyclic (one ring), bicyclic (two rings), tricyclic (three rings), tetracyclic (four rings), pentacyclic (five rings), hexacyclic (six rings). In the case of more than one ring present, rings may be present as fused ring systems, bridged fused ring systems, spiro rings, isolated rings, or combinations thereof. Cycloaliphatic compounds may be saturated or unsaturated, with one or more double bonds (cycloalkenes) or triple bonds (cycloalkynes). Besides hydrogen, other elements may be incorporated in the carbon chain, including oxygen, nitrogen, and sulfur.

Also provided are methods for preparing polymer compositions, including hot-melt adhesives. Methods for preparing polymer compositions may include mixing a polymer and an oligoester as described herein. Methods may further include adding one or more additional components to the composition, such as an additional tackifier, a wax, a stabilizer (e.g., an antioxidant UV stabilizer), a plasticizer (e.g., benzoates, phthalates), paraffin oil, a nucleating agent, an optical brightener, a pigment, a dye, glitter, a biocide, a flame retardant, an anti-static agent, an anti-slip agent, an anti-blocking agent, a lubricants, a filler, or a combination thereof. Methods may further include preparing an oligoester using the methods described herein.

An exemplary road marking formulation may be prepared by: (a) charging a standard mixer with 16 parts oligoester, 2.8 parts oil (e.g., a mineral oil, such as mineral oil; obtained from Statoil), 1 part wax (e.g., polyethylene wax, such as AC6 PE-wax obtained from Honeywell), 1 part of a polymer derived from vinyl acetate (e.g., poly(ethylene-co-vinyl acetate) such as Elvax 22W obtained from DuPont), 0.2 parts fatty acid (e.g., stearic acid), 5.3 parts pigment (e.g., titanium dioxide, such as titanium dioxide obtained from Kronos), 42.4 parts filler (e.g., calcium carbonate), and 37.1 parts reflective filler (e.g., glass beads, such as glass beads obtained from Swarco); and (b) heating (e.g., at 180° C.) and blending at low speed to avoid introducing air bubbles into the melt.

By way of non-limiting illustration, examples of certain aspects of the present disclosure are included below.

EXAMPLES

General Methods

All materials were characterized using the following methods unless otherwise stated.

Hydroxyl numbers (hydroxyl values) were determined according to a modified method (different solvent tetrahydrofuran was applied) of DIN 53240-2 entitled "Determination of Hydroxyl Value—Part 2: Method with Catalyst," which is incorporated herein by reference in its entirety. The rosin or oligoester (dissolved in tetrahydrofuran) was reacted with acetic anhydride in the presence of 4-dimethylaminopyridine. Residual acetic anhydride was hydrolyzed and the resulting mixture titrated with an alcoholic solution of potassium hydroxide (0.5 M).

Acid numbers were determined according to method described in ASTM D465-05 (2010) entitled "Standard Test Methods for Acid Number of Naval Stores Products Including Tall Oil and Other Related Products," which is incorporated herein by reference in its entirety.

Softening points were determined according to method described in ASTM E28-99 (2009) entitled "Standard Test Methods for Softening Point of Resins Derived from Naval Stores by Ring-and-Ball Apparatus," which is incorporated herein by reference in its entirety.

PAN numbers were determined according to method described in ASTM D5974-00 (2010) entitled "Standard Test Methods for Fatty and Rosin Acids in Tall Oil Fractionation Products by Capillary Gas Chromatography," which is incorporated herein by reference in its entirety.

The Gardner color of all materials was measured according to the Gardner Color scale as specified in ASTM D1544-04 (2010) entitled "Standard Test Method for Color of Transparent Liquids (Gardner Color Scale)," which is incorporated herein by reference in its entirety. Gardner colors were measured neat using a Dr Lange LICO® 200 colorimeter.

The third moment or third power average molecular weight ($M_z$) is a higher order molecular weight average which is calculated according to Equation 1a:

$$M_z = \frac{\sum_i N_i M_i^3}{\sum_i N_i M_i^2} \tag{1a}$$

where N is the amount of substance of species i and $M_i$ is the molecular weight of species i.

The weight average molecular weight ($M_w$) is calculated according to Equation 2a:

$$M_w = \frac{\sum_i N_i M_i^2}{\sum_i N_i M_i} \tag{2a}$$

where $N_i$ is the amount of substance of species i and $M_i$ is the molecular weight of species i.

The number average molecular weight ($M_n$) is calculated according to Equation 3a:

$$M_n = \frac{\sum_i N_i M_i}{\sum_i N_i} \quad (3a)$$

where $N_i$ is the amount of substance of species i and $M_i$ is the molecular weight of species i.

Molecular weight distributions and the derived Mn, Mw, and Mz values of the oligoesters, as well as their weight fractions less than 500 gram/mol and 1000 gram/mol were determined by means of Gel permeation chromatography (GPC): Equipment description: Viscotek GPC-Max equipped with a Viscotek TDA305 triple detector array was applied. Column set description: PL-gel Guard column (3 µm, 50×7.5 mm, cat. No. PL1110-1320) and 3 times PL-gel Mixed E (3 µm, 300×7.5 mm, cat. No. PL110-6300) was applied. Tetrahydrofuran (Biosolve AR-grade, stabilized with 0.02-0.03% 2,6-di-tert-butyl-4-methylphenol (BHT), cat. No. 20630502) was applied as eluent. The applied flow rate was 1.0 ml/min. The applied temperature was 40° C. Sample preparation description: About 30 mg of sample was exactly weighted and dissolved in 10.0 ml of eluent, 10.0 µl of toluene was added as a flow rate marker. The applied injection volume was 100 µl. Calibration description: Conversional calibration against eight polystyrene standards in the range of 162-51.000 Da was applied.

Glass transition temperature (Tg) values of the oligoesters were determined by means of Differential Scanning Calorimetry (DSC): Equipment description: TA Instruments Q2000, based on Tzero principle, combined with the TA Refrigerated Cooling System 90. Cup description: Tzero Aluminum Hermetic with pierced lid. Applied gas and flow rate: $N_2$, 50 ml/min. Temperature program description:
Equilibrate at 25.00° C.
Ramp 20.00° C./min to 160.00° C.
Isothermal for 5.00 min
Ramp 10.00° C./min to −60.00° C.
Isothermal for 5 min
Ramp 10.00° C./min to 160.00° C.
Sample intake amount: Approximately 6 mg.

Oxidative-induction time was measured according to the standard methods specified in ASTM D5483-05(2010) entitled "Standard Test Method for Oxidation Induction Time of Lubricating Greases by Pressure Differential Scanning Calorimetry," which is incorporated herein by reference in its entirety. Unless otherwise specified, the oxidative-induction time was measured at 110° C. using 550 psi (3.79 MPa) of oxygen. The time of peak onset and peak maximum, expressed in minutes, is a measure of the oxidative stability of the sample.

Sample analysis was carried according the procedure below: The cell was heated to 110° C. and 2 to 3 mg of sample was put into an aluminum DSC pan. Once the cell temperature had equilibrated, the sample pan was placed in the cell, the cell was closed and purged for 20 seconds with oxygen. Thereafter, the DSC cell was pressurized to 550 psi over the next 40-45 seconds, the oxygen valve was closed and data acquisition was started immediately. Isobaric/isothermal conditions were continued for 360 minutes or until an exothermic oxidation was observed.

Unless otherwise specified, the iodine number was determined according to the standard methods specified in ASTM D5768-02 (2014) entitled "Standard Test Method for Determination of Iodine Value of Tall Oil Fatty Acids," which is incorporated herein by reference in its entirety.

The isomeric composition of the rosins and oligoesters, including the PAN number was determined according to the methods described in ASTM D5974-00 (2010) entitled "Standard Test Methods for Fatty and Rosin Acids in Tall Oil Fractionation Products by Capillary Gas Chromatography," which is incorporated herein by reference in its entirety. Specifically, a sample (1.00 g) and 10 mL 2N potassium hydroxide (KOH) in ethanol were added to a high pressure microwave reaction vessel. The reaction vessel was sealed and placed into the rotor of a Perkin Elmer MULTIWAVE® 3000 Microwave System. The sample was saponified in the microwave for 30 minutes at 150° C. Upon completion of the microwave-assisted saponification, the reaction mixture was transferred to a separatory funnel, and dilute hydrochloric acid was added to reduce the pH value to less than 4. This converted the rosin soaps in the reaction mixture to rosin acids. The resulting rosin acids were isolated by way of ethyl ether extraction. Upon removal of the ether solvent, the rosin acids were derivatized and analyzed using a gas chromatograph according to ASTM D5974-00 (2010).

Dynamic mechanical analysis (DMA): The viscoelastic properties (dynamic moduli, storage modulus G' and loss modulus G" and the loss tangent tan δ) were determined using an ARES-G2 rheometer (TA Instruments) using 10 mm parallel plates with approximately 2.5 mm gap distance over a temperature range from −60° C. up to 140° C. The strain was kept sufficiently high in order to have sufficient torque for the transducer at a fixed frequency of 10 radians/s. The loss tangent (tan δ) value may be calculated as follows: tan δ=G"/G' (i.e. the ratio of loss modulus to storage modulus), wherein δ represents the phase angle, or phase shift caused by DMA applied sinusoidal strain. δ: 0°<δ<90°.

Pressure sensitive adhesive (PSA) formulations were made by a solvent-based method of hot melt pressure sensitive adhesive preparation. The individual components of the adhesive formulation were mixed and dissolved in toluene. The resulting solution was coated onto a polyester surface. An RK K Control Coater purchased from RK PrintCoat Instruments Ltd., (Litlington, Royston, Herts SG8 0QZ United Kingdom) was used. Following this coating, the solvent was allowed to evaporate, leaving a functional adhesive which was applied in the DMA experiments as well as in peel adhesion tests (180°), loop tack tests, resistance to shear tests, and shear adhesion failure tests (SAFT) as further detailed below.

Peel adhesion tests (FTM 1, Peel adhesion (180°) at 300 mm per minute), loop tack tests (FTM 9, Loop tack measurement) and Resistance to shear (FTM 8, Resistance to shear from a standard surface) were conducted according to the test procedures as described in the Finat Technical Handbook, Test Methods, 9th edition, FINAT, The Hague, The Netherlands, May 2014. An RK K Control Coater (RK PrintCoat Instruments Ltd) was used.

The shear adhesion failure test was carried out according to the International Harmonised Test Method described by The European Adhesive Tape Association (Afera) in International Harmonized™-5013 (GTF 6001) entitled: 'Test Method for Shear Adhesion Failure Temperature (SAFT) of Pressure Sensitive Tape'. Herein, the ability of a pressure sensitive tape to remain adhered under a constant load applied parallel to the surface of the tape and substrate during a constantly increasing temperature is determined. Shear adhesion (shear resistance) is the ability of a tape to resist static forces applied in the same plane as the backing.

A strip of tape is applied to a standard steel panel under controlled roll down. The panel is mounted vertically in a programmable heating oven, a standard mass is attached to the free end of the tape, the oven temperature is increased at a constant, controlled rate, and the time to failure is determined. The shear adhesion failure temperature (SAFT) is the temperature at which the bond area fails cohesively in shear when a sample is subjected to a standard load.

The oven was programmed to hold temperature at 40° C. for 20 minutes and then ramp temperature 0.4° C./min (i.e., instead of 0.5° C./min temperature ramp rate as described in the original Afera procedure) was applied. The test ended when all the loads had fallen. A FINAT test roller of 2 kg was applied. The SAFT result was calculated as: T0+(t×Rate), wherein T0 represents the start temperature expressed in ° C. (T0=40° C.), t represents the time when the tape drops expressed in minutes, and Rate equals 0.4, expressed in ° C./minute.

Sample compatibility was assessed by a turbidimetry method. Turbidimetry equipment (CHEMOTRONIC High-Visc Automatic Turbidimetry Analyzer) equipment from Novomatics GmbH, Germany, was applied. Each sample (30 g) was placed in a test tube with a height of 200 mm, an outer diameter of 21.25 mm, an inner diameter of 18.75 mm and a total volume of 53 mL (commercially available from Verrerie Soufflée Mẃcanique S.A.). The samples were heated to 230° C. by the CHEMOTRONIC device and subsequently cooled to 20° C. The overview below shows the applied equipment settings.

| Applied CHEMOTRONIC Automatic Turbidimetry Analyzer Equipment Settings. | | | |
|---|---|---|---|
| Temperature phase 1 (--> 230° C.) | | Temperature phase 2 (230° C. --> 20° C.) | |
| External stirrer speed | 15 rpm | External stirrer speed | 15 rpm |
| Start temp external stirrer | 150° C. | Stop temp. external stirrer | 110° C. |
| Final Temp. | 230° C. | Final Temp. | 20° C. |
| Temp. dev before dwell | 10.0° C. | Temp. Ramp | 10.0 K/min |
| Dwell time | 300 s | Temp. dev. Before dwell | 0.1° C. |

Figure 3:
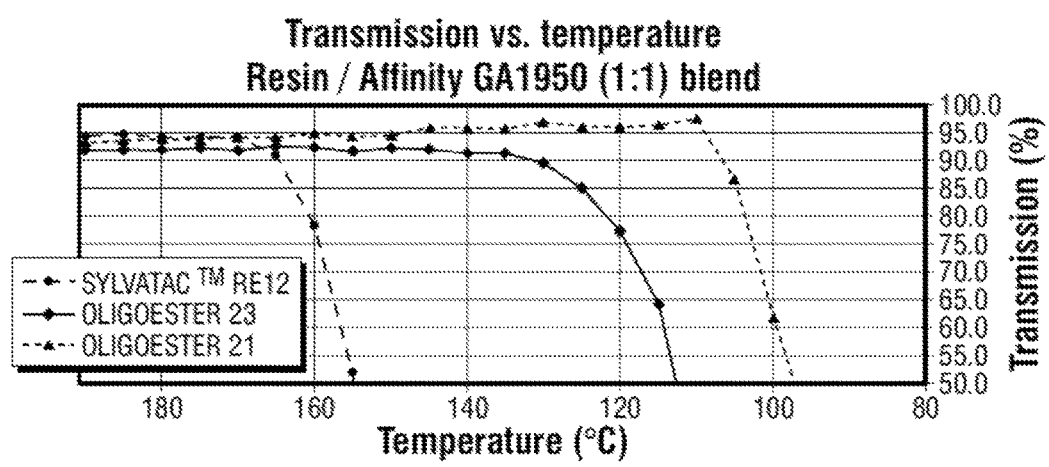
FIG. 3 is a plot showing light transmission percentage as a function of temperature for the indicated samples.
Figure 4:
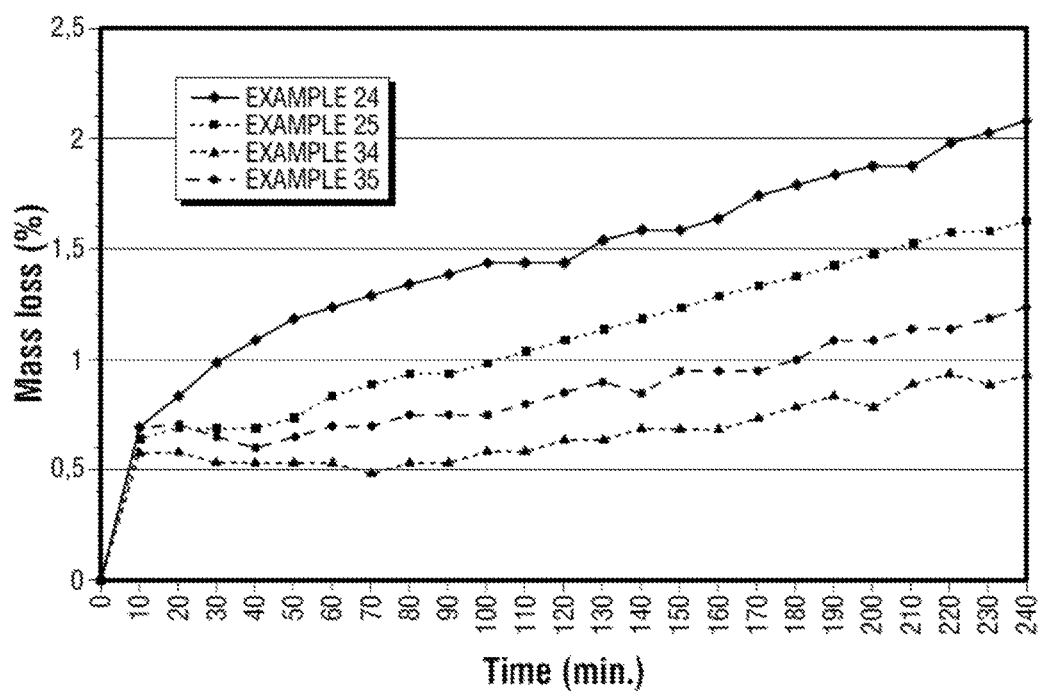
FIGS. 4 and 5 each show the plot of the mass loss as a function of time as determined in a moisture analyzer at 160° C. for the indicated samples.
Figure 5:
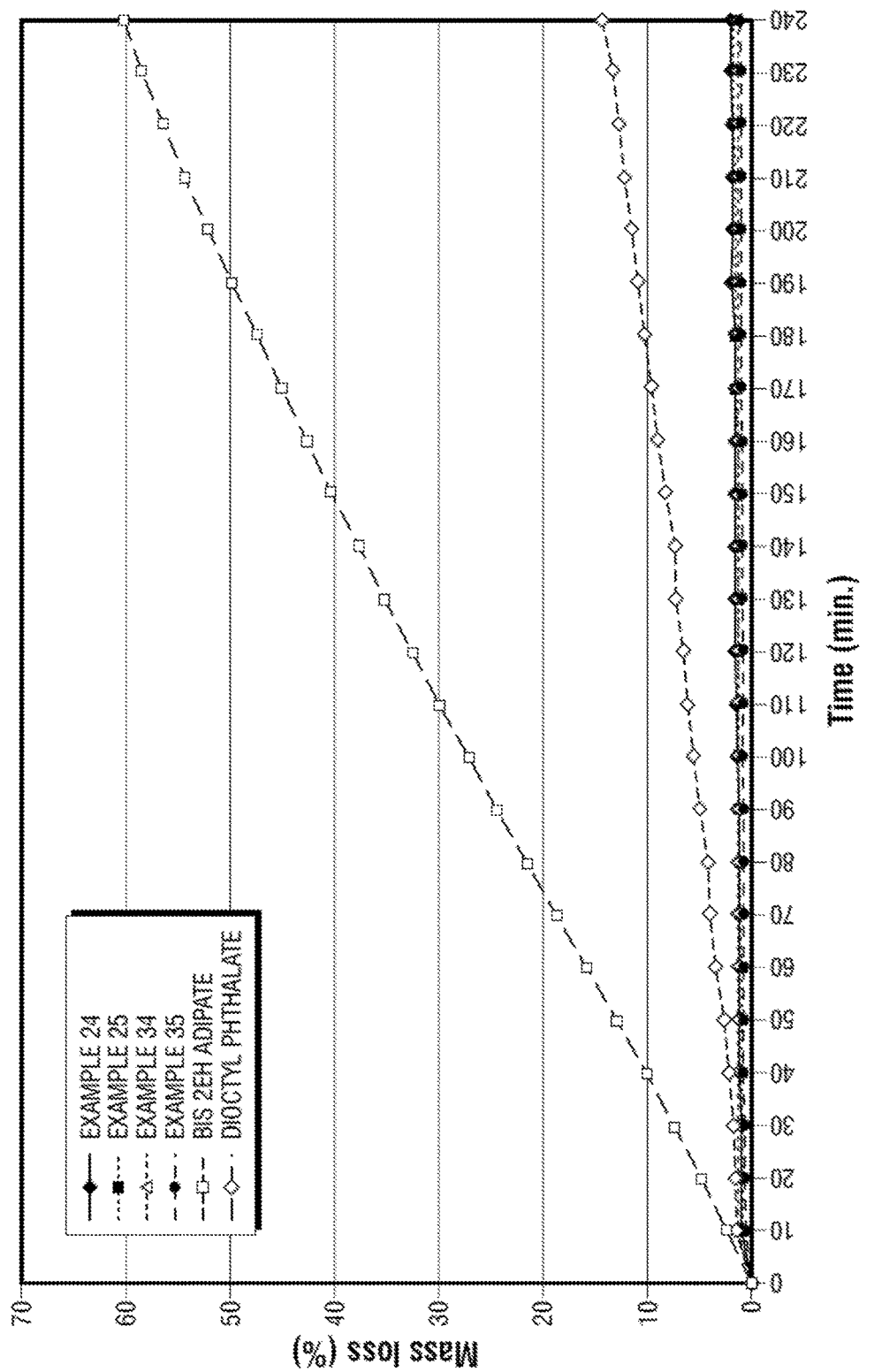

The turbidity detection system of the CHEMOTRONIC equipment is based on light transmission. In principle, turbidity is detected by the absorption due to suspended particles in the liquid and may be associated to a cloud point and qualitatively to a degree of incompatibility. The degree of light transmission through a molten hot-melt adhesive sample versus temperature was measured across a temperature range of 20° C. to 230° C. The resulting relationship is represented as a graphical representation. The light transmission is given as % transmitted light and the temperature is provided as ° C. A lower light transmission percentage relates to a higher degree of turbidity and thereby served as an indicator for a higher cloud point temperature and a lower degree of compatibility of the measured material blend at a given temperature value, or across a given temperature range. The results in the relevant temperature range of 80° C.-180° C. are depicted in FIG. 3.

Tall oil rosin is abbreviated herein as TOR and tall oil fatty acid is abbreviated herein as TOFA.

Preparation of Oligoesters

Samples 1-40 were prepared as indicated in the examples using the reagents in the amounts indicated in Table EX 1R while samples 41-59 were prepared as indicated in the examples. Referring to Table EX 1R, TOR is SYLVAROS™ 90 having an acid value (AV) of 176 mg KOH/g rosin in examples 1-20, AV of SYLVAROS™ 90 is 175 mg KOH/g in examples 22-26, and 61-63, and AV of SYLVAROS™ 90 is 174 mg KOH/g in example 21 and 27-40, PIT is pentaerythritol, Irganox™ 1425 is calcium-bis(((3,5-bis(1,1-dimethylethyl)-4-hydroxyphenyl)methyl)-ethylphosphonate available from BASF, ROSINOX™ is poly-tert-butylphenoldisulfide available from Arkema Inc., SYLFAT™ 2LT, is the tall oil fatty acid (TOFA) used herein having an AV of 202 mg KOH/g TOFA in examples 1-6, 8-9, 11-12, and 14-20, AV of SYLFAT™ 2LT is 196 mg KOH/g in examples 22, 24-41, 45, 54, and 57, and AV of SYLFAT™ FA2 is 198 mg KOH/g in examples 61-63. The following were reagents additionally included: example 19 included 150 g of CENTURY™ MO-6 (AV is 177 mg KOH/g); example 21 included 150 g of CENTURY™ 1224 (AV is 195 mg KOH/g); example 23 included 150 g of isostearic acid (CENTURY™ 1105 (AV is 180 mg KOH/g)); and example 27 included 70.20 g of polyglycerol-4 (from Solvay Chemicals International S.A.). Various properties of the oligoester prepared in Examples 1-59 and 61-63 are tabulated in Table EX IP.

TABLE EX 1R

| Sample | TOR (g) | PTT (g) | ROSI-NOX (g) | TOFA (g) | Adipic Acid (g) | Glycerol (g) | IRGANOX 1425 (g) |
|---|---|---|---|---|---|---|---|
| 1 | 250 | 41.830 | 0.3 | 50 | 12 | 0 | 0.75 |
| 2 | 200 | 42.687 | 0.3 | 100 | 12 | 0 | 0.75 |
| 3 | 180 | 43.030 | 0.3 | 120 | 12 | 0 | 0.75 |

TABLE EX 1R-continued

| Sample | TOR (g) | PTT (g) | ROSI-NOX (g) | TOFA (g) | Adipic Acid (g) | Glycerol (g) | IRGANOX 1425 (g) |
|---|---|---|---|---|---|---|---|
| 4 | 150 | 43.545 | 0.3 | 150 | 12 | 0 | 0.75 |
| 5 | 150 | 43.545 | 0 | 150 | 12 | 0 | 0.75 |
| 6 | 150 | 43.545 | 0.3 | 150 | 12 | 0 | 0.75 |
| 7 | 300 | 40.972 | 0.3 | 0 | 12 | 0 | 0.75 |
| 8 | 900 | 157.853 | 1.2 | 300 | 24 | 0 | 3.0 |
| 9 | 600 | 162.999 | 1.2 | 600 | 24 | 0 | 3.0 |
| 10 | 1200 | 152.707 | 1.2 | 0 | 24 | 0 | 3.0 |
| 11 | 900 | 0 | 1.2 | 300 | 72 | 162.36 | 3.0 |
| 12 | 600 | 0 | 1.2 | 600 | 72 | 167.545 | 3.0 |
| 13 | 1200 | 0 | 1.2 | 0 | 72 | 156.98 | 3.0 |
| 14 | 180 | 0 | 0.3 | 120 | 0 | 34.4 | 0.75 |
| 15 | 180 | 0 | 0.3 | 120 | 12 | 38.083 | 0.75 |
| 16 | 180 | 0 | 0.3 | 120 | 18.0 | 40.281 | 0.75 |
| 17 | 150 | 42.464 | 0.3 | 150 | 12.0 | 0 | 0.75 |
| 18 | 150 | 42.464 | 0.3 | 150 | 12.0 | 0 | 0.75 |
| 19 | 150 | 40.922 | 0.3 | 0 | 12.0 | 0 | 0.75 |
| 20 | 150 | 37.955 | 0.3 | 150 | 0 | 0 | 0.75 |
| 21 | 150 | 37.044 | 0.3 | 0 | 0 | 0 | 0.75 |
| 22 | 150 | 37.144 | 0.3 | 150 | 0 | 0 | 0.75 |
| 23 | 150 | 35.542 | 0.3 | 0 | 0 | 0 | 0.75 |
| 24 | 650 | 173.068 | 1.3 | 650 | 26.0 | 0 | 3.25 |
| 25 | 850 | 166.761 | 1.275 | 425 | 25.5 | 0 | 3.19 |
| 26 | 150 | 31.066 | 0.3 | 150 | 0 | 0 | 0.75 |

TABLE EX 1R-continued

| Sample | TOR (g) | PTT (g) | ROSI-NOX (g) | TOFA (g) | Adipic Acid (g) | Glyc-erol (g) | IRGA-NOX 1425 (g) |
|---|---|---|---|---|---|---|---|
| 27 | 120 | 0 | 0.3 | 180 | 0 | 0 | 0.75 |
| 28 | 180 | 36.59 | 0.308 | 120.08 | 0 | 0 | 0.749 |
| 29 | 120.11 | 37.475 | 0.306 | 180 | 0 | 0 | 0.75 |
| 30 | 120.08 | 37.460 | 0.314 | 180.31 | 0 | 0 | 0.76 |
| 31 | 120.12 | 37.476 | 0.303 | 180.15 | 0 | 0 | 0.758 |
| 32 | 181.19 | 36.719 | 0.303 | 120.29 | 0 | 0 | 0.758 |
| 33 | 180.14 | 36.606 | 0.309 | 120.65 | 0 | 0 | 0.758 |
| 34 | 60.07 | 38.339 | 0.307 | 240.22 | 0 | 0 | 0.75 |
| 35 | 60.29 | 38.369 | 0.303 | 240.14 | 0 | 0 | 0.755 |
| 36 | 119.95 | 37.456 | 0.299 | 180.22 | 0 | 0 | 0.753 |
| 37 | 60.18 | 38.354 | 0.307 | 239.97 | 0 | 0 | 0.75 |
| 38 | 180.06 | 36.593 | 0.320 | 120.629 | 0 | 0 | 0.752 |
| 39 | 120.01 | 37.462 | 0.301 | 180.23 | 0 | 0 | 0.753 |
| 40 | 60.06 | 38.333 | 0.302 | 240.45 | 0 | 0 | 0.751 |

Example 1

SYLVAROS™ 90 (250 g, having an acid value of 176 mg KOH/g rosin) Tall Oil Rosin (TOR) was charged into a four-necked flask (0.5 L) and heated to 180° C. under a nitrogen atmosphere. After the rosin was completely melted, the resulting solution was mechanically stirred. Pentaerythritol (41.830 g), adipic acid (12.0 g) IRGANOX™ 1425 (calcium-bis(((3,5-bis(1,1-dimethylethyl)-4-hydroxyphenyl)methyl)-ethylphosphonate); BASF) (0.75 g) and ROSINOX™ (poly-tert-butylphenoldisulfide; Arkema Inc.) (0.3 g) were added. Subsequently, tall oil fatty acid (TOFA) (SYLFAT™ 2LT, 50.0 g (g), having an acid value of 202 mg KOH/g) was added gradually while maintaining the temperature between 160° C. and 165° C. After the addition the reaction mixture was heated to 275° C. (170° C. to 200° C., 15° C./h; 200° C. to 275° C., 30° C./h) and subsequently reacted at 275° C. for 8 hours while allowing the formed water to escape as vapor. Residual volatiles were stripped off during two hours of nitrogen sparging and the reaction mixture was cooled to 180° C. The product was discharged.

Example 2

The procedure of example 1 was applied.

Example 3

The procedure of example 1 was.

Example 4

The procedure of example 1 was applied.

Example 5

The procedure of Example 4 was repeated, except that ROSINOX™ was omitted from the reaction mixture.

Example 6

The procedure of example 1 was applied.

Example 7

The procedure of example 1 was applied.

Example 8

The procedure of example 1 was applied starting from TOR (SYLVAROS™ 90, 900 g, acid value 176.5 mg KOH/g rosin), pentaerythritol (157.853 g), adipic acid (24.0 g) IRGANOX™ 1425 (3.0 g), ROSINOX™ (1.2 g) and TOFA (SYLFAT™ 2LT (300.0 g, acid value 202.4 mg KOH/g). A 2 L flask was used. The reaction mixture was heated at 275° C. for 12 hours instead of 8 hours.

Example 9

The procedure of example 8 was applied.

Example 10

The procedure of example 1 was applied. A 2 L flask was used. The reaction mixture was heated at 275° C. for 12 hours instead of 8 hours.

Example 11

The procedure of example 8 was applied.

Example 12

The procedure of example 8 was applied.

Example 13

The procedure of example 10 was applied.

Example 14

The procedure of example 1 was applied.

Example 15

The procedure of example 1 was applied.

Example 16

The procedure of example 1 was applied.

Example 17

The procedure of example 1 was applied.

Example 18

The procedure of Example 17 was repeated, except that a higher top temperature of 285° C. was applied instead of 275° C.

Example 19

The procedure of example 1 was applied.

Example 20

The procedure of example 1 was.

Example 21

The procedure of example 1 was applied.

Example 22

The procedure of example 1 was applied, except that 14 hours at 275° C. was applied instead of 8 hours.

Example 23

The procedure of example 1 was applied.

Example 24

The procedure of example 1 was applied, except that 8.5 hours at 275° C. was applied instead of 8 hours.

Example 25

The procedure of example 1 was applied, except that 9 hours at 275° C. was applied instead of 8 hours.

Example 26

The procedure of example 1 was applied however instead of 8 hours at 275° C., 8 hours at 285° C. was applied.

Example 27

The procedure of example 1 was applied however instead of 8 hours at 275° C., 8 hours at 285° C. was applied.

Example 28

The procedure of example 1 was applied however the reaction mixture was heated at 275° C. for 12 hours instead of 8 hours. Reaction yield: 278.7 g.

Example 29

The procedure of example 28 was applied. Reaction yield: 284.0 g.

Example 30

The procedure of example 28 was applied except that instead of 12 hours at 275° C., 6 hours at 285° C. was applied Reaction yield: 284.5 g.

Example 31

The procedure of example 28 was applied except that instead of 12 hours at 275° C., 12 hours at 285° C. was applied. Reaction yield: 282.0 g.

Example 32

The procedure of example 28 was applied and instead of 12 hours at 275° C., 6 hours at 285° C. was applied. Reaction yield: 260.8 g.

Example 33

The procedure of example 28 was applied and instead of 12 hours at 275° C., 6 hours at 275° C. was applied. Reaction yield: 268.9 g.

Example 34

The procedure of example 28 was applied and instead of 12 hours at 275° C., 12 hours at 285° C. was applied. Reaction yield: 284.3 g.

Example 35

The procedure of example 28 was applied. Reaction yield: 294.3 g.

Example 36

The procedure of example 28 was applied however, instead of 12 hours at 275° C., 6 hours at 275° C. was applied. Reaction yield: 281.1 g.

Example 37

The procedure of example 28 was applied however instead of 12 hours at 275° C., 6 hours at 285° C. was applied. Reaction yield: 287.3 g.

Example 38

The procedure of example 28 was applied however instead of 12 hours at 275° C., 12 hours at 285° C. was applied. Reaction yield: 281.5 g.

Example 39

The procedure of example 28 was applied however instead of 12 hours at 275° C., 9 hours at 280° C. was applied. Reaction yield: 284.8 g.

Example 40

The procedure of example 28 was applied however instead of 12 hours at 275° C., 6 hours at 275° C. was applied. Reaction yield: 289.7 g.

Example 41

The procedure of example 1 was applied starting from Massoniana Gum rosin (160.0 g, acid value 169 mg KOH/g), pentaerythritol (38.922 g), ROSINOX™ (0.327 g), IRGANOX™ 1425 (0.801 g and SYLFA™ 2LT (160.07 g). The reaction mixture was heated at 285° C. instead of 275° C. for 8 hours. Reaction yield: 295.2 g.

Example 42

The procedure of example 28 was applied starting from SYLVAROS™ HYR TOR (240.02 g, acid value 180 mg KOH/g), pentaerythritol (39.0246 g), ROSINOX™ (0.313 g), IRGANOX™ 1425 (0.754 g), 1,4-cyclohexanedicarboxylic acid (7.202 g, CAS Number 1076-97-7, Sigma-Aldrich) and decanoic acid (60.09 g, Sigma-Aldrich). Instead of 12 hours at 275° C., 10 hours at 270° C. was applied. Reaction yield: 269.7 g.

Example 43

The procedure of example 28 was applied starting from Elliotti Gum rosin (180.32 g, acid value 164 mg KOH/g), pentaerythritol (30.792 g), ROSINOX™ (0.302 g), IRGANOX™ 1425 (0.750 g), and oleic acid (120.01 g). Instead of 12 hours at 275° C., 8 hours at 280° C. was applied. Reaction yield: 269.8 g.

Example 44

The procedure of example 28 was applied starting from FORAL™ AX-E hydrogenated rosin (255.09 g, acid value 164 mg KOH/g), 4,8-bis(hydroxymethyl)tricyclo[5.2.1.0 2,6]decane, mixture of isomers (CAS No. 26896-48-0, Sigma-Aldrich), (97.29 g), ROSINOX™ (0.305 g), IRGANOX™ 1425 (0.754 g), 1,4-cyclohexanedicarboxylic acid (7.201 g, CAS No. 1076-97-7) and decanoic acid (45.00 g). Instead of 12 hours at 275° C., 10 hours at 270° C. was applied. Reaction yield: 311.7 g.

Example 45

The procedure of example 28 was applied starting from ABIETAT™ DR 835A disproportionated rosin (150.06 g, acid value 152 mg KOH/g), pentaerythritol (36.044 g), ROSINOX™ (0.306 g), IRGANOX™ 1425 (0.757 g), isophthalic acid (6.913 g) and SYLFAT™ 2LT (150.02 g). Instead of 12 hours at 275° C., 8 hours at 285° C. was applied. Reaction yield: 284.7 g.

Example 46

The procedure of example 28 was applied starting from SYLVAROS™ 90 TOR (150.05 g, acid value 173.6 mg KOH/g), 4,4'-isopropylidenedicyclohexanol (61.99 g), 1,4-cyclohexanedimethanol (38.42 g), ROSINOX™ (0.252 g), IRGANOX™ 1425 (0.563 g), phenylacetic acid (75.01 g) and DYMEREX™ (4.51 g). Instead of 12 hours at 275° C., 8 hours at 275° C. was applied. Reaction yield: 168.4 g.

Example 47

Palm oil (140.88 g, acid value 15.6 mg KOH/g, iodine value=52 g I2/100 g), glycerol (18.057 g) and Irganox™ 1425 (0.753 g) were charged to a four necked flask (0.5 L) equipped as in example 1. The resulting mixture was heated up to 200° C. in a nitrogen atmosphere and agitation (150 rpm) was started. SYLVAROS™ 90 TOR (159.42 g, acid value 174 mg KOH/g) was added. The reaction was heated to 275° C. (30° C. per hour). After 6 hours at 275° C., the reaction was sparged for 2 hours with nitrogen gas. The product was discharged. Reaction yield: 226.2 g.

Example 48

The procedure of example 47 was applied starting from rapeseed oil (141.84 g, acid value 8.6 mg KOH/g, iodine value=114 g I2/100 g), glycerol (18.37 g), IRGANOX™ 1425 (0.751 g) and SYLVAROS™ 90 TOR (159.72 g, acid value 174 mg KOH/g). Reaction yield: 230.1 g.

Example 49

The procedure of example 47 was applied starting from linseed oil (141.12 g, acid value 2.2 mg KOH/g, iodine value=183 g I2/100 g), glycerol (16.83 g), IRGANOX™ 1425 (0.759 g) and SYLVAROS™ 90 TOR (159.31 g, acid value 174 mg KOH/g). Reaction yield: 220.2 g.

Example 50

The procedure of example 1 was applied starting from SYLVATAC™ RE 85 TOR (150.05 g, acid value 4.8 mg KOH/g), rapeseed oil (139.97 g, acid value 8.6 mg KOH/g) and IRGANOX™ 1425 (0.737 g). The reaction mixture was heated at 275° C. for 6 hours instead of 8 hours. Reaction yield: 248.9 g.

Example 51

The procedure of example 47 was applied starting from rapeseed oil (132.27 g, acid value 8.6 mg KOH/g, iodine value=114 g I2/100 g), pentaerythritol (18.19 g), IRGANOX™ 1425 (0.718 g) and SYLVAROS™ 90 TOR (150.4 g, acid value 174 mg KOH/g). Reaction yield: 242.6 g.

Example 52

The procedure of example 50 was applied starting from the rosin ester SYLVATAC™ RE 85 (150.05 g, acid value 4.8 mg KOH/g), linseed oil (141.04 g, acid value 2.2 mg KOH/g, iodine value=183 g I2/100 g) and p-toluenesulfonic acid (0.735 g). Reaction yield: 207.0 g.

Example 53

The procedure of example 50 was applied using the rosin ester SYLVATAC™ RE 85 (145.32 g, acid value 4.8 mg KOH/g), palm oil (140.88 g, acid value 15.6 mg KOH/g, iodine value=52 g I2/100 g) and p-toluenesulfonic acid (0.735 g). Reaction yield: 197.6 g.

Example 54

The procedure of example 1 was applied starting from TOR (SYLVAROS™ 90, 150 g, acid value 174 mg KOH/g), pentaerythritol (51.019 g), adipic acid (30.0 g), ROSINOX™ (0.3 g), IRGANOX™ 1425 (0.75 g) and TOFA (SYLFAT™ 2LT, acid value 196 mg KOH/g, 150 g).

Example 55

The procedure of example 1 was applied starting from TOR (150 g, acid value 181 mg KOH/g rosin), palmitic acid (150 g, acid value 220 mg KOH/g), triethylene glycol (101.811 g), succinic acid (6.0 g), 3-methyladipic acid (6.0 g, CAS Number 3058-01-3, Sigma-Aldrich), ROSINOX™ (0.3 g) and IRGANOX™ 1425 (0.75 g)

Example 56

The procedure of example 55 was applied starting from Elliotti gum rosin (150 g, acid value 166.5 mg KOH/g), oleic acid (150 g, acid value 200 mg KOH/g), trimethylolpropane (50.491 g) tricarballylic acid (3.0 g), ROSINOX™ (0.3 g) and IRGANOX™ 1425 (0.75 g).

Example 57

The procedure of example 1 was applied starting from massoniana gum rosin (150 g, acid value 168.7 mg KOH/g), glycerol (35.148 g), isophthalic acid (6.0 g), ROSINOX™ (0.3 g), IRGANOX™ 1425 (0.75 g) and TOFA (SYLFAT™ 2LT, 150 g, acid value 196 mg KOH/g).

Example 58

The procedure of example 1 was applied starting from TOR (SYLVAROS™ 90, 160 g, acid value 176.0 mg KOH/g rosin), 4,8-Bis(hydroxymethyl)tricyclo[5.2.1.02,6]decane, mixture of isomers (123.8 g, CAS number 26896-48-0, Sigma Aldrich, pre-heated to 80° C.), 1,2,3,4-butanetetracarboxylic acid (1.2 g, Sigma Aldrich), Irganox™ 1425 (0.6 g), Rosinox™ (0.240 g) and cyclohexanecarboxylic acid (80 g, acid value 437 mg KOH/g, Sigma Aldrich, pre-heated to 80° C.). The reaction mixture was heated at 275° C. for 9 hours instead of 8 hours.

Example 59

The procedure of example 55 was applied starting from TOR (SYLVAROS™ R type S 90/10, 200 g, acid value 182.0 mg KOH/g), 1-adamantanecarboxylic acid (150 g, acid value 310 mg KOH/g), dipentaerythritol (58.928 g), dimethyl adipate (6.0 g), ROSINOX™ (0.3 g) and IRGANOX™ 1425 (0.75 g).

Example 60

Oligoester 24 (50 g) was placed in ajar (118 mL) and heated at 40° C. in an oven for 30 minutes. Thereafter, the jar containing oligoester 24 was placed in a pre-heated water bath (38° C.) with adjustable temperature control. The oligoester 24 material was mechanically stirred using a stainless steel 3 blade propeller-type mixing blade affixed to a stir shaft and attached to an IKA RW16 basic laboratory mixer (mixer speed 4). A digital thermometer was placed in above the stir blades. The water bath temperature was raised to 40° C. and 3.5 g of a nonylphenol ethoxylate surfactant was added. After 10 minutes, temperature was raised to 42° C., mixer speed was adjusted to 5, and 1 g of triethanolamine was added. After 5 minutes, the mixer speed was adjusted to 6 and four water portions (in total 24.8 g water) were successively added during 28 minutes which resulted in a thick aqueous dispersion of oligoester 24. To this thick dispersion, 20 g of water was slowly added and the resulting dispersion was mixed by hand to produce the final aqueous dispersion of oligoester 24 having the following characteristics: Solids content (%)=67.6. pH=8.8. Viscosity (Brookfield viscometer, 25° C., Spindle #5, mPa·s (cP))=6128. Particle size (median, nm)=454.

Example 61

The procedure of example 1 was applied starting from TOR (SYLVAROS™ 90, 150 g), pentaerythritol (39.483 g), camphoric acid (6.0 g), 1,3-cyclohexanedicarboxylic acid (6.0 g), cis-norbornene-endo-2,3-dicarboxylic acid (3.0 g), IRGANOX™ 1425 (0.6 g), LOWINOX™ TBM-6 (0.6 g) and TOFA (SYLFAT™ FA2, 150.0 g).

Example 62

TOR (SYLVAROS™ 90, 110 g), UNIDYME™ 30 (17.6 g), Polyethylene glycol 300 (PEG 300) (149.81 g), IRGANOX™ 1425 (0.44 g), LOWINOX™ TBM-6 (0.44 g) and TOFA (SYLFAT™ FA2, 110.0 g) were charged into a four-necked flask (0.5 L) and heated to 170° C. under a nitrogen atmosphere, and further heated to 275° C. (170° C. to 200° C., 15° C./h; 200° C. to 275° C., 30° C./h), and subsequently reacted at 275° C. for 12 hours while allowing the formed water to escape as vapor. The reaction mixture was cooled to 120° C. and discharged.

Example 63

TOR (SYLVAROS™ 90, 66 g), glycerol (165 g), di(ethylene glycol) hexyl ether (78.43 g), IRGANOX™ 1425 (0.44 g), ROSINOX™ (0.44 g), anthraquinone (0.44 g), adipic acid (8.8 g), and TOFA (SYLFAT™ FA2, 110.0 g) were charged into a four-necked flask (0.5 L) and heated to 180° C. under a nitrogen atmosphere, and further heated to 255° C. (20° C./h), and subsequently reacted at 255° C. for 10.5 hours while allowing the formed water to escape as vapor. The reaction mixture was cooled to 120° C. and discharged.

TABLE EX 1P

| Sample | SP (° C.) | Acid Value (mg KOH/g) | Hydroxyl Value (mg KOH/g) | $T_g$ (° C.) | Gardner Color (neat) | $M_n$ (g/mol) | $M_w$ (g/mol) | $M_z$ (g/mol) | Wt. fraction <500 g/mol (%) | Wt. fraction <1000 g/mol (%) |
|---|---|---|---|---|---|---|---|---|---|---|
| 1 | 62.5 | 1.8 | 19.9 | 11.2 | 5.6 | 1429 | 2108 | 3264 | 2.2 | 14.1 |
| 2 | N.D. | 1.4 | 23.1 | −20.1 | N.D. | 1580 | 2636 | 4598 | 2.3 | 10.3 |
| 3 | N.D. | 1.2 | N.D. | −24.9 | 5.6 | 1746 | 2935 | 5276 | 1.8 | 7.7 |
| 4 | N.D. | 1.1 | 24.6 | −39.2 | 5.6 | 1826 | 3271 | 6223 | 1.8 | 6.9 |
| 5 | N.D. | 1.2 | N.D. | −34.8 | 6.3 | 1930 | 3710 | 7672 | 1.8 | 6.4 |
| 6 | N.D. | 1.4 | N.D. | −33.9 | 6.3 | 1852 | 3456 | 6698 | 2.1 | 6.8 |
| 7 | 99.0 | 2.9 | 14.0 | N.D. | 5.4 | 1250 | 1852 | 3198 | 3.3 | 16.6 |
| 8 | N.D. | 1.6 | N.D. | 5.3 | 6.6 | 1454 | 2084 | 3179 | 1.9 | 11.9 |
| 9 | N.D. | 1.5 | N.D. | −33.9 | N.D. | 1738 | 2977 | 5428 | 2.0 | 7.3 |
| 10 | N.D. | 2.7 | N.D. | 53 | 5.9 | 1137 | 1437 | 1828 | 3.5 | 21.5 |
| 11 | N.D. | N.D. | N.D. | −8.9 | 4.4 | 1226 | 1951 | 3371 | 2.4 | N.D. |
| 12 | N.D. | 1.1 | N.D. | −41.6 | 4.7 | 1459 | 2543 | 4806 | 2.0 | 18.5 |
| 13 | N.D. | 2.1 | N.D. | 41 | 4.6 | 1023 | 1373 | 1963 | 2.7 | 49.8 |
| 14 | N.D. | 0.9 | 2.9 | −32.9 | 3.9 | 1170 | 1491 | 2117 | 1.1 | 31.9 |
| 15 | N.D. | 1.1 | N.D. | −31.1 | 4.0 | 1330 | 1930 | 3107 | 1.2 | 23.4 |
| 16 | N.D. | 1.5 | N.D. | −31.1 | 4.0 | 1402 | 2129 | 3592 | 1.3 | 21.7 |
| 17 | N.D. | N.D. | N.D. | −37.8 | N.D. | 1861 | 3332 | 6562 | 1.6 | 6.5 |
| 18 | N.D. | 0.9 | N.D. | −30.6 | 5.7 | 2054 | 4583 | N.D. | 1.6 | 6.1 |
| 19 | N.D. | 1.2 | N.D. | −30.4 | 5.5 | 1669 | 2434 | 3796 | 1.5 | 7.3 |
| 20 | N.D. | 1.2 | N.D. | −38.4 | 5.2 | 1539 | 2176 | 3303 | 1.7 | 7.8 |
| 21 | N.D. | 1.4 | N.D. | −27.6 | N.D. | 1292 | 1470 | 1606 | 2.3 | 9.2 |
| 22 | N.D. | N.D. | N.D. | −35.2 | N.D. | 1697 | 2694 | 4670 | 1.5 | 6.6 |
| 23 | N.D. | 1.0 | N.D. | −31.4 | N.D. | 1259 | 1417 | 1543 | 2.2 | 9.6 |
| 24 | N.D. | 2.8 | 18.4 | −35.3 | 5.2 | 1556 | 2567 | 4306 | 3.1 | 9.0 |
| 25 | N.D. | 3.3 | 17.0 | −10.7 | 5.2 | 1370 | 2056 | 3111 | 3.6 | 12.3 |
| 26 | N.D. | 1.7 | N.D. | −34.1 | 4.1 | 1631 | 3068 | 5699 | 3.6 | 7.0 |
| 27 | N.D. | 1.0 | N.D. | −38.6 | 6.1 | 2026 | 5426 | 12713 | 3.2 | 7.7 |
| 28 | N.D. | 0.6 | 13.6 | −18.9 | 5.6 | 1543 | 2178 | 3359 | 1.2 | 7.6 |
| 29 | N.D. | 0.3 | 14.6 | −42 | 5.4 | 1861 | 2998 | 5390 | 0.9 | 4.7 |
| 30 | N.D. | 0.52 | 15.3 | −44.7 | 5.7 | 1814 | 2960 | 5299 | 1.2 | 5.6 |
| 31 | N.D. | 0.4 | 13.7 | −36.1 | 6.3 | 2166 | N.D. | N.D. | 1.0 | 4.7 |

TABLE EX 1P-continued

| Sample | SP (° C.) | Acid Value (mg KOH/g) | Hydroxyl Value (mg KOH/g) | $T_g$ (° C.) | Gardner Color (neat) | $M_n$ (g/mol) | $M_w$ (g/mol) | $M_z$ (g/mol) | Wt. fraction <500 g/mol (%) | Wt. fraction <1000 g/mol (%) |
|---|---|---|---|---|---|---|---|---|---|---|
| 32 | N.D. | 0.6 | 14.2 | −23.9 | 6.6 | 1543 | 2233 | 3516 | 1.3 | 8.5 |
| 33 | N.D. | 1.0 | 16.1 | −26.2 | 6.4 | 1445 | 1940 | 2833 | 1.6 | 9.4 |
| 34 | N.D. | 0.5 | 14.2 | −57.3 | 6.0 | 2629 | N.D. | N.D. | 1.2 | 3.4 |
| 35 | N.D. | 0.5 | 17.6 | −62.5 | 5.5 | 2166 | 4122 | 8659 | 1.0 | 4.0 |
| 36 | N.D. | 0.7 | 17.9 | −50.9 | 6.0 | 1684 | 2323 | 3568 | 1.2 | 5.9 |
| 37 | N.D. | 0.5 | 15.6 | −58.8 | 5.5 | 2209 | N.D. | N.D. | 1.1 | 3.9 |
| 38 | N.D. | 0.5 | 13.5 | −12.7 | 7.2 | 1734 | 2908 | 5522 | 1.1 | 6.6 |
| 39 | N.D. | 0.5 | 16.9 | −40.0 | 6.7 | 1871 | 3369 | 6711 | 1.5 | 5.9 |
| 40 | N.D. | 0.5 | 16.6 | −44.3 | 5.2 | 1871 | 2814 | 4690 | 1.1 | 4.2 |
| 41 | N.D. | 0.6 | 15.2 | −25.6 | 4.8 | 1769 | 2812 | 5061 | 0.7 | 6.1 |
| 42 | 66.4 | 1.7 | 12.7 | 24.9 | 8.1 | 1241 | 1549 | 2055 | 1.5 | 15.9 |
| 43 | N.D. | 1.7 | 1.6 | −33.2 | 4.6 | 1391 | 1729 | 2186 | N.D. | N.D. |
| 44 | 48.7 | 2.6 | 0.1 | 8.7 | <1.0 | 647 | 685 | 733 | N.D. | N.D. |
| 45 | N.D. | 0.8 | 4.1 | −18.2 | 7.6 | 2016 | 4038 | N.D. | 1.7 | 4.8 |
| 46 | N.D. | 6.4 | 0.0 | −12.5 | 6.3 | 537 | 632 | N.D. | N.D. | N.D. |
| 47 | N.D. | 0.8 | 0.3 | −41.3 | 8.2 | 1083 | 1245 | 1503 | 1.6 | N.D. |
| 48 | N.D. | 0.5 | 0.9 | −48.6 | 6.0 | 1108 | 1303 | 1614 | 1.5 | N.D. |
| 49 | N.D. | 1.1 | 0.1 | −28.9 | 7.1 | 1277 | 1925 | 3408 | 1.4 | N.D. |
| 50 | N.D. | 0.4 | 1.8 | −57.1 | 5.0 | 1050 | 1229 | 1521 | 1.6 | N.D. |
| 51 | N.D. | 0.6 | 6.2 | −43.4 | 7.7 | 1185 | 1543 | 2135 | 1.5 | N.D. |
| 52 | N.D. | 1.3 | 0.0 | −28.2 | 16.1 | 1336 | 2176 | 4166 | 1.7 | N.D. |
| 53 | N.D. | 1.4 | 0.0 | −45.3 | 11.2 | 1084 | 1248 | 1448 | 2.3 | N.D. |
| 54 | N.D. | 2.0 | N.D. | −32.8 | N.D. | 2002 | 6944 | 19071 | 3.8 | 8.3 |
| 55 | N.D. | 1.7 | N.D. | −42.5 | N.D. | 834 | 930 | 1027 | 3.8 | N.D. |
| 56 | N.D. | 3.8 | N.D. | −55.3 | N.D. | 1120 | 1420 | 1843 | 3.5 | N.D. |
| 57 | N.D. | 1.4 | N.D. | −36.7 | N.D. | 1359 | 2044 | 3405 | 1.2 | N.D. |
| 58 | N.D. | 0.9 | N.D. | −3.5 | N.D. | 498 | 565 | N.D. | N.D. | N.D. |
| 59 | 125.7 | 2.1 | N.D. | 84.0 | N.D. | 1207 | 1581 | 2323 | 2.3 | N.D. |
| 61 | N.D. | N.D. | N.D. | −40.4 | N.D. | 1775 | 2745 | 4610 | N.D. | N.D. |
| 62 | N.D. | N.D. | N.D. | −65.8 | N.D. | 1023 | 1412 | 2222 | N.D. | N.D. |
| 63 | N.D. | N.D. | N.D. | N.D. | N.D. | 761 | 958 | 1312 | N.D. | N.D. |

N.D. = not determined

Characterization of Oligoesters, Esters, and Formulations Thereof

For purposes of comparison, three commercially available liquid rosin esters (SYLVATAC™ RE 12, SYLVATAC™ RE 25, and SYLVATAC™ RE 40, commercially available from Arizona Chemical, a subsidiary of Kraton Corporation) were characterized via DSC and GPC. The glass transition temperature (Tg) and molecular weight distribution of these commercially available liquid rosin esters is included in Table 1 below.

TABLE 1

| | $T_g$ (° C.) | $M_n$ (g/mol) | $M_w$ (g/mol) | Fraction <500 g/mol (%) | Fraction <1000 g/mol (%) |
|---|---|---|---|---|---|
| SYLVATAC ™ RE 12 (Comparative) | −24.3 | 526 | 606 | 33 | 94 |
| SYLVATAC ™ RE 25 (Comparative) | −8.3 | 479 | 543 | 36 | 97 |
| SYLVATAC ™ RE 40 (Comparative) | −3.8 | 568 | 672 | 18 | 88 |

The oxidative-induction times of two example oligoesters (Example 2 and Example 4) and an example liquid rosin ester (Example 7) were measured using DSC. The results are included in Table 2 below. As illustrated in Table 2, the oligoester compositions exhibited improved oxidative stability relative to analogous liquid rosin esters.

TABLE 2

| | Oxidative Induction Onset Time (110° C., minutes) | Oxidative Induction Peak Time (110° C., minutes) |
|---|---|---|
| Example 7 (Comparative) | 26.3 | 32.9 |
| Example 2 | 37.0 | 46.0 |
| Example 4 | 36.8 | 59.2 |

Hot-Melt Adhesive Formulations

Four example hot-melt adhesive formulations (A, B, C and D) were prepared and evaluated by means of Dynamic Mechanical Analysis (DMA). The composition of the four example adhesive formulations are provided below.

Adhesive formulation A: a 1:1:1 (ratio by weight) blend of VECTOR™ 4111 styrene-isoprene-styrene (SIS) triblock copolymer: ZONATAC™ NG 98 styrenated terpene resin: Example 2 oligoester.

Adhesive formulation B: a 1:1:1 (ratio by weight) blend of VECTOR™ 4111 SIS triblock copolymer: ZONATAC™ NG 98 styrenated terpene resin: SYLVATAC™ RE 40 liquid rosin ester.

Adhesive formulation C: a 1:1:1 (ratio by weight) blend of VECTOR™ 4111 SIS triblock copolymer: ZONATAC™ NG 98 styrenated terpene resin: Example 4 oligoester.

Adhesive formulation D: a 1:1:1 (ratio by weight) blend of VECTOR™ 4111 SIS triblock copolymer: ZONATAC™ NG 98 styrenated terpene resin: SYLVATAC™ RE 12 liquid rosin ester VECTOR™ 4111 is commercially available from TSRC Corporation/Dexco Polymers. ZONATAC™ NG 98 is commercially available from Arizona Chemical, a subsidiary of Kraton Corporation.

Figure 2:
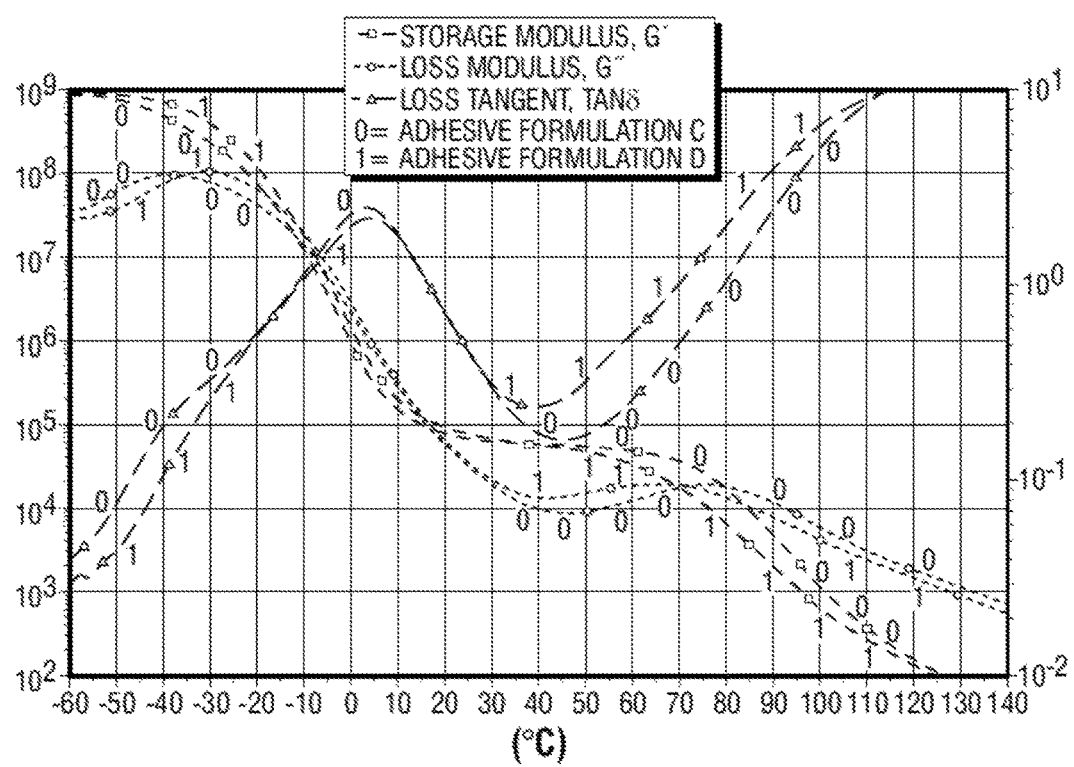
FIG. 2 is a plot showing the dynamic mechanical analysis results for Adhesive Formulation C and Adhesive Formulation D.

FIGS. 1 and 2 are a plot comparing the dynamic mechanical analysis results (including Loss tangent (tan δ) values, storage modulus (G') values and loss modulus (G") values) for Adhesive Formulations A and B (FIG. 1) and Adhesive Formulations C and D. Loss tangent (tan δ) values are depicted in logarithmic scale according to the right vertical axis (ranging from 10-2 to 101) numerical values as dimensionless number as a function of the temperature (ranging from −60° C. to 140° C.). The storage modulus (G') values are shown in logarithmic scale (ranging from 102 to 109) and expressed in Pascal units according to the left vertical axis numerical values as a function of the temperature (in ° C.). The loss modulus (G") values are shown in logarithmic scale (ranging from 102 to 109) and expressed in Pascal units according to the left vertical axis numerical values as a function of the temperature (in ° C.). As shown in FIGS. 1 and 2, adhesive formulations prepared using oligoesters exhibit similar dynamic mechanical properties to adhesive formulations prepared using conventional liquid rosin esters.

Pressure Sensitive Adhesive Formulations

Four example pressure sensitive adhesive (PSA) formulations (PSA1, PSA2, PSA3, and PSA4) were prepared and evaluated. The composition of the four example PSAs are provided in Table 3 below.

TABLE 3

| Component | PSA1 (wt. %) | PSA2 (wt. %) | PSA3 (wt. %) | PSA4 (wt. %) |
|---|---|---|---|---|
| Polymer (Kraton ™ D1161) | 28.6 | 28.6 | 28.6 | 28.6 |
| SYLVALITE ™ RE 100S | 39.3 | 17.9 | 39.3 | 21.4 |
| SYLVATAC ™ RE 12 | 32.1 | | | |
| SYLVATAC ™ RE 40 | | 53.5 | | |
| Example 24 oligoester | | | 32.1 | |
| Example 25 oligoester | | | | 50 |

PSA formulations PSA1, PSA2, PSA3, and PSA4 were made using the solvent-based method for preparing hot-melt pressure sensitive adhesives described above in the General Methods section. Toluene was used as the solvent. PSA formulations PSA1, PSA2, PSA3, and PSA4 were made in such a way that the resulting Dynamic Mechanical Analysis loss tangent (tan δ) peak temperatures were identical (i.e., 7° C.). This allowed for a better comparison of the loop tack, peel, shear and SAFT test results of the SYLVATAC™ RE 12 vs. Example 24 and SYLVATAC™ RE 40 vs. Example 25 based PSA formulations, respectively. These results of these analyses are included in Tables 4 and 5 below.

Since SYLVATAC™ RE 12 and the oligoester of Example 24 exhibit lower Tg values than SYLVATAC™ RE 40 and the oligoester of Example 25, formulations prepared from SYLVATAC™ RE 12 and the oligoester of Example 24 will require relatively more SYLVALITE™ RE 100S to provide a PSA formulation having a similar $T_g$ value as compared to PSA formulations prepared from SYLVATAC™ RE 40 and the oligoester of Example 25. As a consequence, the ratios of the components applied in the PSA formulations (PSA1, PSA2, PSA3, and PSA4) are not identical.

TABLE 4

| Adhesive | Loop tack HDPE (N) | Loop tack SS (N) | Peel 180° 20 minutes HDPE (N) | Peel 180° 24 hours HDPE (N) | Peel 180° 20 minutes SS (N) | Peel 180° 24 hours SS (N) |
|---|---|---|---|---|---|---|
| PSA1 | 18.6 ± 0.3 AF | 24.4 ± 0.5 AF | 13.0 ± 0.1 AF | 15.7 ± 0.3 AF | 25.1 ± 0.6 AF | 29.3 ± 0.2 CF |
| PSA2 | 19.7 ± 0.5 AF | 28.0 ± 0.1 AF | 14.3 ± 0.3 AF | 17.1 ± 0.2 AF | 29.4 ± 0.6 CF | 28.8 ± 0.2 CF |
| PSA3 | 19.3 ± 0.6 AF | 25.3 ± 0.5 AF | 12.9 ± 0.2 AF | 15.1 ± 0.3 AF | 24.4 ± 0.7 AF | 28.0 ± 1.3 CF/AF |
| PSA4 | 17.9 ± 0.3 AF | 25.5 ± 0.4 AF | 11.9 ± 0.2 AF | 14.1 ± 0.5 AF | 22.4 ± 0.7 AF | 26.2 ± 12 CF/AF |

Table 4 includes the results of loop tack tests and peel adhesion tests (180°) for PSA formulations PSA1, PSA2, PSA3, and PSA4. The results of the tests are expressed as average values±standard error. These values are based on four experiments, except for PSA2 (loop tack, SS) and PSA1 (peel 180o HDPE, 20 minutes) which are based on three experiments. AF=Adhesive Failure. CF=Cohesive Failure. PET 50 microns film was applied and 28 gsm coat weight. HDPE=High Density Polyethylene. SS=Stainless Steel. Peel adhesion values are expressed as Newton/25 mm width; 'Loop' tack values are expressed as the average value (ignoring the initial peak) and range for the five strips tested in Newton; Resistance to shear from a standard surface is expressed as the average time taken for the three strips to shear from the test plate according to the results descriptions in as described in the Finat Technical Handbook, Test Methods, 9th edition, FINAT, The Hague, The Netherlands, May 2014.

TABLE 5

| Adhesive | Shear SS (Min) | SAFT SS (° C.) |
|---|---|---|
| PSA1 | 73 ± 10 CF | 41.7 ± 0.5 CF |
| PSA2 | 65 ± 5 CF | 46.5 ± 1.0 CF |
| PSA3 | 3806 ± 628 CF/AF | 58.4 ± 0.9 CF |
| PSA4 | 5628 ± 1110 CF/AF | 57.5 ± 0.5 CF |

Table 5 includes the results of resistance to shear tests and shear adhesion failure tests (SAFT) for PSA formulations PSA1, PSA2, PSA3, and PSA4. The results of the tests are expressed as average values±standard error. These results are based on six experiments, except for PSA3 which is based on five experiments. PET 50 microns film was applied and 28 gsm coat weight. AF=Adhesive Failure. CF=Cohesive Failure. SS=Stainless Steel.

Oligoester Compatibility

The compatibility of oligoesters with hydrophobic polymers, such as polyolefins, was evaluated by measuring the turbidity of two 1:1 (by weight) polyolefin-oligoester blends prepared from AFFINITY™ GA 1950 polyolefin elastomer and an oligoester (Example 21 or Example 23). A 1:1 (by weight) polyolefin-oligoester blend prepared from AFFINITY™ GA 1950 polyolefin elastomer and a conventional liquid rosin ester (SYLVATAC™ RE 12) was also evaluated for purposes of comparison. Turbidity was measured as a function of temperature using a CHEMOTRONIC HighVisc Automatic Turbidimetry Analyzer turbidimetry equipment. The results are illustrated in FIG. 3. As demonstrated by FIG. 3, the oligoester blends exhibited high light transmission percentages over a broader temperature ranges as compared with a blend prepared using a conventional liquid rosin ester, suggesting that the oligoesters are more compatible with apolar (hydrophobic) polymers, such as polyolefins, than conventional liquid rosin esters.

Viscosity Stability

The viscosity stability the oligoester of Example 24 was compared with the viscosity of stability of an alkyd-like material (Example 54). Viscosity was measured using the following procedure. Briefly, the oligoester (2.5 g) was placed in an aluminum cup (51 mm bottom diameter, 64 mm top diameter, 28 mL, Type 550028, commercially available from Novelis Deutschland GmbH, D-58840 Plettenberg, Germany) and aged for 16 hours at 120° C. Viscosities of the initial and aged (16 h/120° C.) oligoester was measured at a constant temperature of 60° C. using a parallel-plate rheometer (Anton Paar—Physica MCR101, plate-plate diameter was 25 mm with a gap of 1 mm). The shear rate was varied linearly from 1 to 50 s$^{-1}$ and backwards to 1 s$^{-1}$. The resulting stable viscosity at a shear rate of 50 s$^{-1}$ was then recorded.

TABLE 6

|  | Example 24 | Example 54 |
|---|---|---|
| η (Pa · s) Initial | 2.06 | 6.85 |
| η (Pa · s) Aged (16 hours, 120° C.) | 3.11 | 25.2 |

As illustrated by the results in Table 6, the oligoester of Example 24 exhibited a more stable viscosity upon aging than 54 the alkyd-like material of Example 54. In addition, the oligoester of Example 24 exhibited a lower initial viscosity than the alkyd-like material of Example 54.

Tire and Tire Tread Formulations

An example oligoester was evaluated for use as an extender in tire formulations. The properties of a conventional tire formulation including a conventional extender (treated distillate aromatic extract, TDAE) was compared to the performance of a modified tire formulation including the oligoester of Example 9 in place of TDAE. The formulations evaluated are detailed in the table below (Table 7.)

TABLE 7

|  | TDAE | Example 9 |
|---|---|---|
| SBR | 55 | 55 |
| BR | 35 | 35 |
| NR | 25 | 25 |
| Silica | 80 | 80 |
| Carbon Black | 5 | 5 |
| Coupling Agent | 8 | 8 |
| Zinc Oxide | 3 | 3 |
| Stearic Acid | 2 | 2 |
| iPPD | 1 | 1 |
| 6PPD | 2 | 2 |
| TMQ | 0.5 | 0.5 |
| Wax | 1 | 1 |

TABLE 7-continued

|  | TDAE | Example 9 |
|---|---|---|
| TDAE oil | 24 | 4 |
| Oligoester | — | 20 |
| Sulfur | 1.9 | 1.9 |
| CBS | 2.5 | 2.5 |
| DPG | 2.3 | 2.3 |
| Total | 248.2 | 248.2 |

Rubber samples were prepared for testing using the standard procedures detailed in ISO 23529:2010 entitled "Rubber—General procedures for preparing and conditioning test pieces for physical test methods," which is incorporated herein by reference in its entirety. DMA properties were measured using a temperature-sweep in double shear mode from −60° C. to 100° C. with 1° C./min at 10 Hz and 0.1% (−60° C. till −5° C.) and 3% (−5° C. till 100° C.) dynamic strain using a Metravib +450N analyser.

Tan δ values at 0° C. were measured for both the TDAE tire formulation and the modified tire formulation including the oligoester of Example 9 in place of TDAE. Tan δ at 0° C. may serve as an indicator of tire wet grip performance, with higher tan δ values signifying an improved wet grip performance. See "Improved tire wet traction through the use of mineral fillers", Mouri et al, Bridgestone Corporation, Japan, Rubber Chemistry and Technology, Vol. 72, 1999, Pages 960-968; and "Viscoelastic properties of elastomers and tire wet skid resistance", Takino et al, Toyo Tire and rubber Co. Ltd, Japan, Rubber Chemistry and Technology, Vol. 70, 1997, Pages 584-594. The results are included in the table below (Table 8).

TABLE 8

|  | TDAE | Example 9 |
|---|---|---|
| Wet grip indicator (Tanδ 0° C.) | 100 | 117 |

The modified tire formulation including the oligoester of Example 9 in place of TDAE showed a 17% improvement in tan δ at 0° C., suggesting that the wet grip performance of tire treads made using oligoesters will be improved as compared to the wet grip performance of tire treads made using conventional extenders such as TDAE.

Moisture Analyzer Mass Loss Determination

Test equipment: Mettler HR73 halogen moisture analyser, Sample mass: 2 gram; Temperature: 160° C.; Time range: 0-240 minutes. Test procedure description: Step A) The empty sample holder is weighed and tarred to zero gram; Step B) Test sample mass is determined into the sample pan; Step C) The sample chamber is closed and heated to 160° C.; Step D) Mass (expressed as a percentage of the original sample mass) is measured with an interval of 10 minutes.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

ADDITIONAL DISCLOSURE

The following enumerated aspects of the present disclosures are provided as non-limiting examples.

A first aspect which is an oligoester composition derived from one or more rosins; at least 15% by weight one or more monocarboxylic acids; one or more polyhydric alcohols; and less than Q % by weight one or more polycarboxylic acids, where Q is defined by the Formula (I) or Formula (II) below $$10 - 2\left(\sum_{\substack{polycarboxylic\\acids}} (XY)\right) \quad \text{Formula I}$$

$$8 - 2\left(\sum_{\substack{polycarboxylic\\acids}} (XY)\right) \quad \text{Formula II}$$

wherein Σ denotes the mathematical summation of the product of X and Y for each of the one or more polycarboxylic acids; X is the carboxylic acid functionality of the polycarboxylic acid, and is an integer ranging from 2 to 4; and Y is the polycarboxylic acid weight fraction of the polycarboxylic acid, and ranges from 0 to 1 with the sum of the weigh fractions for the one or more polycarboxylic acids equals 1.

A second aspect which is the oligoester composition of any preceding aspect, wherein the composition is derived from greater than 0% to 4% by weight one or more polycarboxylic acids, or greater than 0% to 3% by weight one or more polycarboxylic acids, or from greater than 0% to 1% by weight one or more polycarboxylic acids.

A third aspect which is the oligoester composition of any preceding aspect, wherein the composition is derived from greater than 0% to 6% by weight one or more dicarboxylic acids, or from greater than 0% to 3% by weight one or more dicarboxylic acids, or from greater than 0% to 1% by weight one or more dicarboxylic acids.

A fourth aspect which is the oligoester composition of any preceding aspect, wherein the one or more polycarboxylic acids are selected from the group consisting of adipic acid, 3-methyladipic acid, succinic acid, sebacic acid, 1,4-cyclohexanedicarboxylic acid, 1,3-cyclohexanedicarboxylic acid, 1,2-cyclohexanedicarboxylic acid, rosin dimer, isophthalic acid, terephthalic acid, phthalic acid, tall oil fatty acid dimer, hydrogenated tall oil fatty acid dimer, 2-(2-carboxyphenyl)benzoic acid, 2,5-furandicarboxylic acid, camphoric acid, cis-norbornene-endo-2,3-dicarboxylic acid, trimellitic acid, and combinations thereof.

A fifth aspect which is the oligoester composition of any preceding aspect, wherein the composition is derived from no polycarboxylic acids.

A sixth aspect which is the oligoester composition of any preceding aspect, wherein the composition is derived from 15% to 90% by weight one or more monocarboxylic acids, or from at least 20% by weight one or more monocarboxylic acids, or from 25% to 85% by weight one or more monocarboxylic acids, or from 35% to 85% by weight one or more monocarboxylic acids, or from 40% to 80% by weight one or more monocarboxylic acids.

A seventh aspect which is the oligoester composition of any preceding aspect, wherein the one or more monocarboxylic acids comprise at least six carbon atoms.

An eighth aspect which is the oligoester composition of any preceding aspect, wherein the one or more monocarboxylic acids comprise a fatty acid.

A ninth aspect which is the oligoester composition of any preceding aspect, wherein the fatty acid comprises a hydrogenated fatty acid, or a fatty acid derived from a vegetable oil, or an animal oil, or fat, or combinations thereof.

A tenth aspect which is the oligoester composition of any preceding aspect, wherein the one or more monocarboxylic acids are selected from the group consisting of oleic acid, linoleic acid, alpha-linolenic acid, palmitic acid, stearic acid, and combinations thereof.

An eleventh aspect which is the oligoester composition of any preceding aspect, wherein the one or more monocarboxylic acids comprise a tall oil fatty acid.

A twelfth aspect which is the oligoester composition of any preceding aspect wherein the one or more monocarboxylic acids have an iodine number of less than 115 mg/g, or less than 80 mg/g as determined according to the method described in ASTM D5768-02 (2014).

A thirteenth aspect which is the oligoester composition of any preceding aspect, wherein the composition is derived from 5% to 35% by weight, or 9% to 18% by weight, or from 9.7% to 12.7% by weight of one or more polyhydric alcohols.

A fourteenth aspect which is the oligoester composition of any preceding aspect, wherein the one or more polyhydric alcohols have an average hydroxyl functionality of from two to ten.

A fifteenth aspect which is the oligoester composition of any preceding aspect, wherein the one or more polyhydric alcohols comprise from 2 to 30 carbon atoms or from 2 to 16 carbon atoms.

A sixteenth aspect which is the oligoester composition of any preceding aspect, wherein the polyhydric alcohol comprises up to a total 35 wt. % of one or more monoalcohols wherein the monoalcohols are characterized by a boiling point of greater than 230° C.

A seventeenth aspect which is the oligoester composition of any preceding aspect, wherein the one or more polyhydric alcohols have a boiling point greater than 240° C.

An eighteenth aspect which is the oligoester composition of any preceding aspect, wherein the one or more polyhydric alcohols comprise a polyol that comprises a first hydroxyl group separated from a second hydroxyl group by at least three carbon atoms or at least six carbon atoms.

A nineteenth aspect which is the oligoester composition of any preceding aspect, wherein the one or more polyhydric alcohols comprise a polyol wherein each hydroxyl group of the polyol is separated from the other hydroxyl group of the polyol by at least three carbon atoms or at least six carbon atoms.

A twentieth aspect which is the oligoester composition of any preceding aspect, wherein the one or more polyhydric alcohols comprise a polyol where each hydroxyl group of the polyol is separated from the other hydroxyl group of the polyol by at least six carbon atoms.

A twenty-first aspect which is the oligoester composition of any preceding aspect, wherein the one or more polyhydric alcohols comprise an aliphatic alcohol, or a cycloaliphatic alcohol.

A twenty-second aspect which is the oligoester composition of any preceding aspect, wherein the one or more polyhydric alcohols are selected from the group consisting of ethylene glycol, propylene glycol, diethylene glycol, triethylene glycol, tetraethylene glycol, polyethylene glycol, neopentylglycol, trimethylene glycol, glycerol, trimethylolpropane, trimethylolethane, pentaerythritol, pentaerythritol technical grade, dipentaerythritol, tripentaerythritol, 1,4-cyclohexanediol, polyglycerol, polyglycerol technical grade, polyglycerol-3, polyglycerol-4, cyclohexane-1,4-dimethanol, tricyclo[5.2.1.0(2.6)]decane-4,8-dimethanol, hydrogenated bisphenol A, (4,4'-Isopropylidenedicyclohexanol), mannitol, sorbitol, xylitol, maltitol, lactitol, and combinations thereof.

A twenty-third aspect which is the oligoester composition of any preceding aspect, wherein the composition is derived from 5% to 80% by weight rosin, or from 30% to 75% by weight rosin, or from 30% to 60% by weight rosin.

A twenty-fourth aspect which is the oligoester composition of any preceding aspect, wherein the rosin is derived from tall oil rosin, gum rosin, wood rosin, or a combination thereof.

A twenty-fifth aspect which is the oligoester composition of any preceding aspect, wherein the rosin as obtained by hydrolysis from the oligoester has a PAN number of less than 15, or less than 10, or less than 5, as determined according to the method described in ASTM D5974-00 (2010).

A twenty-sixth aspect which is the oligoester composition of any preceding aspect, wherein the rosin comprises at least 35% by weight, or at least 45% by weight dehydroabietic acid, based on the total weight of the rosin as obtained by hydrolysis from the oligoester.

A twenty-seventh aspect which is the oligoester composition of any preceding aspect, wherein the ratio of the weight of one or more polycarboxylic acids to the weight of the rosin and the one or more monocarboxylic acids is less than 1:20, or less than 1:30, or less than 1:50, or less than 1:100.

A twenty-eighth aspect which is the oligoester composition of any preceding aspect, wherein the ratio of the weight of the rosin to the weight of the one or more monocarboxylic acids ranges from 60:40 to 10:85.

A twenty-ninth aspect which is the oligoester composition of any preceding aspect, wherein the oligoester composition is derived from: 5% to 75% by weight rosin; from 25% to 85% by weight one or more monocarboxylic acids; from 7% to 35% by weight one or more polyhydric alcohols; and from 0% to less than 4% by weight one or more polycarboxylic acids.

A thirtieth aspect which is the oligoester composition of any preceding aspect, wherein the oligoester composition is derived from: 15% to 75% by weight rosin; from 36% to 80% by weight one or more monocarboxylic acids; from 9%/0 to 35% by weight one or more polyhydric alcohols; and from 0% to less than 4% by weight one or more polycarboxylic acids.

A thirty-first aspect which is the oligoester composition of any preceding aspect, wherein the oligoester composition is derived from: 30% to 75% by weight rosin; from 25% to 60% by weight one or more monocarboxylic acids; from 5% to 18% by weight one or more polyhydric alcohols; and from 0% to less than 4% by weight one or more polycarboxylic acids.

A thirty-second aspect which is the oligoester composition of any preceding aspect, wherein the composition exhibits an oxidative-induction onset time at 110° C. of at least 30 minutes, or of at least 40 minutes, as measured using the methods specified in ASTM D5483-05(2010).

A thirty-third aspect which is the oligoester composition of any preceding aspect, wherein the composition has a neat Gardner color of 7 or less or 6 or less.

A thirty-fourth aspect which is the oligoester composition of any preceding aspect, wherein the composition exhibits less than a 10% change or less than a 5% change in neat Gardner color when heated to a temperature of 160° C. for a period of three hours.

A thirty-fifth aspect which is the oligoester composition of any preceding aspect, wherein the composition has a weight average molecular weight of at least 500 g/mol, or from 1,000 g/mol to 8,000 g/mol, or from 1,000 g/mol to 5,000 g/mol.

A thirty-sixth aspect which is the oligoester composition of any preceding aspect, wherein less than 35 percent by weight or less than 20 percent by weight of the oligoester composition has a molecular weight of less than 1,000 g/mol.

A thirty-seventh aspect which is the oligoester composition of any preceding aspect, wherein less than 10 percent or less than 5 percent by weight of the oligoester composition has a molecular weight of less than 1,000 g/mol.

A thirty-eighth aspect which is the oligoester composition of any preceding aspect, wherein less than 10 percent or less than 4 percent or less than 2 percent by weight of the oligoester composition has a molecular weight of less than 500 g/mol.

A thirty-ninth aspect which is the oligoester composition of any preceding aspect, wherein the oligoester composition has an acid value less than 12 mg KOH/gram, or less than 6 mg KOH/gram.

A fortieth aspect which is the oligoester composition of any preceding aspect, wherein the oligoester composition has a hydroxyl number of less than 30 mg KOH/gram, or less than 20 mg KOH/gram, or less than 12 mg KOH/gram, or less than 6 mg KOH/gram, or than 3 mg KOH/gram.

A forty-first aspect which is an oligoester composition derived from one or more rosins, one or more monocarboxylic acids, one or more polyhydric alcohols, and optionally one or more polycarboxylic acids, wherein the composition has a Tg of less than −20° C. and an initial viscosity of less than 5 Pa-s at 60° C.

A forty-second aspect which is the oligoester composition of the forty-first aspect wherein the composition has a Tg of less than −30° C.

A forty-third aspect which is the oligoester composition of any of the forty-first through forty-second aspects wherein the composition has an initial viscosity of less than 3 Pa-s.

A forty-fourth aspect which is an oligoester composition derived from one or more rosins, one or more monocarboxylic acids, one or more polyhydric alcohols, and optionally one or more polycarboxylic acids, wherein the composition has a weight average molecular weight of from 1000 g/mol to 8000 g/mol, or 1500 g/mol to 5000 g/mol and a Tg of less than −20° C. or of less than −30° C.

A forty-fifth aspect which is an oligoester composition of any preceding aspect, wherein a viscosity increase after 16 hours thermal aging at 120° C. is less than 8,000 Centipoise or less than 2,500 Centipoise, or less than 1,300 Centipoise at 60° C.

A forty-sixth aspect which is an oligoester composition of any preceding aspect, wherein the initial viscosity at 60° C. is less than 4,500 Centipoise or less than 2,500 Centipoise.

A forty-seventh aspect which is an oligoester composition derived from one or more rosins one or more monocarboxylic acids; one or more polyhydric alcohols; and less than Q % by weight one or more polycarboxylic acids, where Q is defined by the formula below $$10-2\left(\sum_{\substack{polycarboxylic \\ acids}} (XY)\right)$$

wherein Σ denotes the mathematical summation of the product of X and Y for each of the one or more polycarboxylic acids; X is the carboxylic acid functionality of the polycarboxylic acid, and is an integer ranging from 2 to 4; and Y is the polycarboxylic acid weight fraction of the polycarboxylic acid, and ranges from 0 to 1 with the sum of the weight fractions for the one or more polycarboxylic acids equals 1; wherein the oligoester composition has a softening point of 85° C. or less; and wherein the oligoester composition has a hydroxyl value of 30 mg KOH/g or less.

A forty-eighth aspect which is an oligoester composition of the forty-seventh aspect, wherein the composition is derived from greater than 0% to 6% or from greater than 0% to 4% by weight one or more dicarboxylic acids.

A forty-ninth aspect which is an oligoester composition of any of the forty-seventh through forty-eighth aspects, wherein the composition is derived from no polycarboxylic acids.

A fiftieth aspect which is an oligoester composition of any of the forty-seventh through forty-ninth aspects wherein the composition is derived from more than 5% by weight one or more monocarboxylic acids.

A fifty-first aspect which is an oligoester composition of any of the forty-seventh through fiftieth aspects wherein the oligoester composition has a hydroxyl value less than 20 mg KOH/g.

A fifty-second aspect which is an oligoester composition of any of the forty-seventh through fifty-first aspects wherein the oligoester composition has a softening point of 60° C. or less.

A fifty-third aspect which is a polymeric composition comprising a polymer, and the oligoester composition of any of any preceding aspects.

A fifty-fourth aspect which is the polymeric composition of the fifty-third aspect wherein the polymer is chosen from a polyacrylate, a polyolefin, a polyamide, a polyvinyl ether, a polyurethane, a polyester, a polyvinyl ester, copolymers thereof, and blends thereof.

A fifty-fifth aspect which is the polymeric composition of the fifty-fourth aspect wherein the polymer is derived from one or more ethylenically-unsaturated monomers.

A fifty-sixth aspect which is the polymeric composition of any of the fifty-third through fifty-fifth aspects wherein the one or more ethylenically-unsaturated monomers are selected from the group consisting of from styrene, ethylene, butadiene, isoprene, (meth)acrylate monomers, vinyl acetate, vinyl ester monomers, and combinations thereof.

A fifty-seventh aspect which is the polymeric composition of any of the fifty-third through fifty-sixth aspects wherein the polymer is a copolymer, or a block copolymer, or comprises a polymer derived from vinyl acetate, or comprises poly(ethylene-co-vinyl acetate).

A fifty-eighth aspect which is the polymeric composition of any of the fifty-third through fifty-seventh aspects wherein the polymer is derived from between 10% by weight and 40% by weight vinyl acetate, or wherein the polymer comprises polyvinyl acetate, or wherein the polymer comprises a copolymer of ethylene and n-butyl acrylate, or wherein the polymer comprises a copolymer derived from styrene and one or more of isoprene and butadiene.

A fifty-ninth aspect which is the polymeric composition of any of the fifty-third through fifty-eighth aspects wherein the polymer is present in an amount ranging from 20% to 90% by weight, or from 30% to 50% by weight, or from 5% to 50% by weight, or from 20% to 40% by weight, based on the total weight of the polymeric composition.

A sixtieth aspect which is the polymeric composition of any of the fifty-third through fifty-ninth aspects further comprising a wax, or an antioxidant, or combinations thereof.

A sixty-first aspect which is the polymeric composition of any of the fifty-third through sixtieth aspects wherein the composition is a hot-melt adhesive.

A sixty-second aspect which is the polymeric composition of any of the fifty-third through sixty-first aspects wherein the hot-melt adhesive comprises (a) from 20% by weight to 70% by weight, based on the total weight of the hot-melt adhesive, of a polymer chosen from a poly(ethylene-co-vinyl acetate), an ethylene n-butylacrylate, an ethylene ethylhexyl acrylate, an ethylene-ethyl acrylate, an ethylene-methyl acrylate, and combinations thereof; and (b) from 5% by weight to 50% by weight, based on the total weight of the hot-melt adhesive, of the oligoester composition.

A sixty-third aspect which is the polymeric composition of any of the fifty-third through sixty-second aspects wherein the oligoester composition has a glass transition temperature higher than 20° C.

A sixty-fourth aspect which is the polymeric composition of any of the fifty-third through sixty-third aspects wherein the composition is a pressure sensitive adhesive (PSA).

A sixty-fifth aspect which is the polymeric composition of the sixty-fourth aspect, wherein the PSA comprises (a) from 20% by weight to 60% by weight, based on the total weight of the PSA, of a polymer; and (b) from 5% by weight to 50% by weight, based on the total weight of the PSA, of the oligoester composition, wherein the oligoester composition has a glass transition temperature of less than 0° C.

A sixty-sixth aspect which is the polymeric composition of the sixty-fourth aspect wherein the PSA comprises (a) from 20% by weight to 50% by weight, based on the total weight of the PSA, of a polymer, (b) from 5% by weight to 40% by weight, based on the total weight of the PSA, of the oligoester composition, wherein the oligoester composition has a glass transition temperature of less than 0° C.; (c) from 5% by weight to 40% by weight, based on the total weight of the PSA, of a tackifier having a glass transition temperature higher than 20° C.; and (d) from 0% to 20% by weight, based on the total weight of the PSA, of an oil.

A sixty-seventh aspect which is the polymeric composition of the sixty-fourth aspect wherein the PSA comprises (a) from 20% by weight to 50% by weight, based on the total weight of the PSA, of a styrene-containing triblock copolymer; (b) from 0% to 10% by weight, based on the total weight of the PSA, of a styrene-containing diblock copolymer; (c) from 5% by weight to 40% by weight, based on the total weight of the PSA, of the oligoester composition, wherein the oligoester composition has a glass transition temperature of less than 0° C.; (d) from 5% by weight to 40% by weight, based on the total weight of the PSA, of a tackifier having a glass transition temperature higher than 20° C.; and E from 0% to 20% by weight, based on the total weight of the PSA, of an oil.

A sixty-eighth aspect which is the polymeric composition of any preceding aspect wherein the composition comprises a dispersion, or an adhesive dispersion, or an aqueous dispersion or combinations thereof.

A sixty-ninth aspect which is the polymeric composition of any preceding aspect wherein the dispersion has a solids content of from 35% to 80%.

A seventieth aspect which is the polymeric composition of the sixty-fifth aspect wherein the dispersion comprises particles having a median particle size of from 5 nm to 5000 nm or from 5 nm to 1500 nm, or 5 nm to 500 nm as determined by scanning electron microscopy.

A seventy-first aspect which is the polymeric composition of the sixty-fifth aspect, wherein the polymer comprises a polyacrylate.

A seventy-second aspect which is the polymeric composition of the fifty-third aspect wherein the polymer is selected from the group consisting of acrylonitrile-butadiene-styrene, an acrylic polymer, an acrylate copolymer, bromobutyl rubber, butyl terpolymer, cellulose acetate, cellulose butyrate, cellulose propionate, cellulose nitrate, chlorinated polyvinylchloride, polyvinylchloride, chlorosulphonated polyethylene, cyanoacrylates, styrenic block copolymer consisting of polystyrene blocks and rubber blocks wherein the rubber blocks consist of polybutadiene, polyisoprene or hydrogenated versions thereof (SEBS and SEPS triblock copolymers), caprolactone-styrene diblock copolymers, urethane acrylic copolymer, urethanes, polyolefins, ethylene-propylene-diene copolymer, epoxy resins, ethylene-vinyl acetate copolymer, ionomers, nitrile rubber, polyacrylonitrile, polyamides, polyamine, polyaniline, polybutadiene, polybutylene, poly(butyl methacrylate), polycarbonate, polyester, polyetherimide, polyethylacrylate, polyethylene, poly(ethylene)oxide, polyisobutylene, polyisoprene, polyimide, polylactide, polymethylmethacrylate, polypropylene, poly(N-vinylcarbazole), poly(N-vinyl pyrrolidone), polyphenylene ether, polystyrene, polysulfone, polysulfide, polyvinylacetate, polyvinylalcohol, polyvinylbutyral, polyvinylchloride, polyvinylidinefluoride, polyvinylidinechloride, polyurethanes, protein, natural rubber, silicone, styrene-butadiene rubber, styrene-butadiene-styrene, starch, copolymers thereof, and blends thereof.

A seventy-third aspect which is the polymeric composition of the fifty-fourth aspect wherein the composition comprise (a) from 20-60% by weight of a polyolefin, and (b) from 20-50% by weight of the oligoester of any preceding claim.

A seventy-fourth aspect which is the polymeric composition of the seventy-third aspect wherein the turbidimetric light transmission percentage is at least 90% at temperatures between 130° C. and 180° C. or between 110° C. and 180° C.

A seventy-fifth aspect which is a pressure sensitive adhesive comprising a polymer and the oligoester of any preceding claim wherein adhesive exhibits a loop tack adhesion value on stainless steel of at least 25 Newton/25 mm, a 180° peel adhesion on stainless steel after 20 minutes of at least 20 Newton/25 mm, a shear adhesion time of at least 3000 minutes, and a SAFT failure temperature of at least 55° C.

A seventy-sixth aspect which is the pressure sensitive adhesive of the seventy-fifth aspect wherein the adhesive has a dynamic mechanical analysis loss tangent peak temperature value of about 7° C.

A seventy-seventh aspect which is a method for preparing the oligoester composition of any preceding claim, comprising: (a) esterifying a mixture comprising one or more rosins, one or more monocarboxylic acids, and optionally one or more polycarboxylic acids with one or more polyhydric alcohols to form the oligoester composition.

A seventy-eighth aspect which is the method of the seventy-seventh aspect wherein esterifying step (a) comprises contacting the mixture and the one or more polyhydric alcohols with an esterification catalyst wherein the esterification catalyst comprises calcium-bis (((3,5-bis(1,1-dimethylethyl)-4-hydroxyphenyl)methyl)-ethylphosphonate in the presence or absence of an esterification catalyst further comprising disproportionating the one or more rosins prior to the esterifying step (a) wherein the step of disproportionating the one or more rosins comprises contacting the one or more rosins with a disproportionation catalyst wherein the disproportionation catalyst comprises a phenol sulfide disproportionation catalyst wherein step of disproportionating the one or more rosins is performed at an elevated temperature.

A seventy-ninth aspect which is the method of any of the seventy-seventh through seventy-eighth aspects further comprising hydrogenating the oligoester composition wherein the step of hydrogenating the oligoester composition comprises contacting the oligoester composition with a hydrogenation catalyst.

An eightieth aspect which is the method of any of the seventy-seventh through seventy-ninth aspects wherein the mixture has a stoichiometric molar ratio of total hydroxyl functionality to total carboxyl functionality of 1.20 or less or 1.12 or less or 1.06 or less or 0.94 or less, or from 1.00 to 1.15.

An eighty-first aspect which is method for preparing the oligoester composition of any preceding claim, comprising (a) transesterifying a mixture comprising one or more rosins or esters thereof, one or more monocarboxylic acids or esters thereof, and optionally one or more polycarboxylic acids or esters thereof with one or more polyhydric alcohols to form the oligoester composition.

A eighty-second aspect which is method of the eighty-first aspect, wherein the mixture comprises one or more rosin esters wherein the one or more rosin esters comprise rosin-derived methyl esters, ethyl esters, polyol esters, or combinations thereof, or wherein the mixture comprises one or more monocarboxylic acid esters and wherein the one or more monocarboxylic acid esters comprise monocarboxylic acid-derived methyl esters, ethyl esters, glycerol esters, or combinations thereof or wherein the mixture comprises one or more polycarboxylic acid esters and wherein the one or more polycarboxylic acid esters comprise polycarboxylic acid-derived methyl esters, ethyl esters, or combinations thereof.

An eighty-third aspect which is method of any of the eighty-first through eighty-second aspects, wherein the mixture comprises a rosin-derived polyol ester, a triglyceride oil, and optionally one or more polycarboxylic acid-derived methyl esters, ethyl esters, or combinations thereof.

A eighty-fourth aspect which is method of any of the eighty-first through eighty-third aspects wherein esterifying step (a) comprises contacting the mixture and the one or more polyhydric alcohols with an esterification catalyst wherein the esterification catalyst comprises calcium-bis (((3,5-bis(1,1-dimethylethyl)-4-hydroxyphenyl)methyl)-ethylphosphonate) or wherein esterifying step (a) comprises contacting the mixture and the one or more polyhydric alcohols in the absence of an esterification catalyst.

An eighty-fifth aspect which is method of any of the eighty-first through eighty-fourth aspects further comprising disproportionating the one or more rosins prior to the esterifying step (a) wherein the step of disproportionating the one or more rosins comprises contacting the one or more rosins with a disproportionation catalyst, wherein the disproportionation catalyst comprises a phenol sulfide disproportionation catalyst, and wherein step of disproportionating the one or more rosins is performed at an elevated temperature.

An eighty-sixth aspect which is method of any of the eighty-first through eighty-fifth aspects further comprising hydrogenating the oligoester composition, wherein the step of hydrogenating the oligoester composition comprises contacting the oligoester composition with a hydrogenation catalyst, wherein the mixture has a stoichiometric molar ratio of total hydroxyl functionality to total carboxyl functionality of 1.20 or less, or 1.12 or less, or 1.06 or less.

An eighty-seventh aspect which is method of any of the eighty-first through eighty-sixth aspects wherein the mixture has a stoichiometric excess of total carboxyl functionality as compared to total hydroxyl functionality of 0.94 or less.

An eighty-eighth aspect which is a tire tread composition comprising a rubber polymer, a filler, and the oligoester composition of any preceding claim.

An eighty-ninth aspect which is the composition of the eighty-eighth aspect wherein the rubber polymer comprises a copolymer derived from styrene and one or more of isoprene and butadiene.

An ninetieth aspect which is the composition of any of the eighty-eighth through eighty-ninth aspects wherein the oligoester composition has a glass transition temperature of from −60° C. to 0° C.

A ninety-first aspect which is the composition of any of the eighty-eighth through ninetieth aspects wherein the oligoester composition is present in an amount of from 1 to 80 parts by weight, or 2 to 75 parts by weight, or 5 to 70 parts by weight, or 35 to 75 parts by weight, or 55 to 75 parts by weight based on 100 parts by weight of the rubber polymer.

An ninety-second aspect which is the composition of any of the eighty-eighth through ninety-first aspects wherein the tire tread composition exhibits improved wet grip as evidenced by an increased tan δ at 0° C. or exhibits improved wet grip as evidenced by at least a 10% increase in tan δ at 0° C., or exhibits improved wet grip as evidenced by at least a 15% increase in tan δ at 0° C. relative to the same composition wherein the oligoester composition is replaced by treated distillate aromatic extract (TDAE).

A ninety-third aspect which is an oligoester derived from 5% to 75% by weight rosin; from 25% to 85% by weight one or more monocarboxylic acids; from 7% to 35% by weight one or more polyhydric alcohols; and from 0% to less than 4% by weight one or more polycarboxylic acids.

A ninety-fourth aspect which is the oligoester of the ninety-third aspect wherein the oligoester is derived from 15% to 75% by weight rosin; from 36% to 80% by weight one or more monocarboxylic acids; from 9%/0 to 35% by weight one or more polyhydric alcohols; and from 0% to less than 4% by weight one or more polycarboxylic acids.

A ninety-fifth aspect which is the oligoester of any of the ninety-third through ninety-fourth aspects wherein the oligoester is derived from 30% to 75% by weight rosin; from 25% to 60% by weight one or more monocarboxylic acids; from 5% to 18% by weight one or more polyhydric alcohols; and from 0% to less than 4% by weight one or more polycarboxylic acids.

A ninety-sixth aspect which is a pressure sensitive adhesive (PSA) comprising (a) from 20% by weight to 60% by weight, based on the total weight of the PSA, of a polymer, and (b) from 5% by weight to 50% by weight, based on the total weight of the PSA, of an oligoester, wherein the oligoester has a glass transition temperature of less than 0° C.

A ninety-seventh aspect which is a pressure sensitive adhesive (PSA) comprising (a) from 20% by weight to 50% by weight, based on the total weight of the PSA, of a polymer; (b) from 5% by weight to 40% by weight, based on the total weight of the PSA, of an oligoester, wherein the oligoester has a glass transition temperature of less than 0° C.; (c) from 5% by weight to 40% by weight, based on the total weight of the PSA, of a tackifier having a glass transition temperature higher than 20° C.; and (d) from 0% to 20% by weight, based on the total weight of the PSA, of an oil.

A ninety-eighth aspect which is a pressure sensitive adhesive (PSA) comprising (a) from 20% by weight to 50% by weight, based on the total weight of the PSA, of a styrene-containing triblock copolymer, (b) from 0% to 10% by weight, based on the total weight of the PSA, of a styrene-containing diblock copolymer; (c) from 5% by weight to 40% by weight, based on the total weight of the PSA, of an oligoester, wherein the oligoester has a glass transition temperature of less than 0° C.; (d) from 5% by weight to 40% by weight, based on the total weight of the PSA, of a tackifier having a glass transition temperature higher than 20° C.; and (e) from 0% to 20% by weight, based on the total weight of the PSA, of an oil.

A ninety-ninth aspect which is a pressure sensitive adhesive (PSA) comprising a polymer and an oligoester wherein adhesive exhibits a loop tack adhesion value on stainless steel of at least 25 Newton/25 mm, a 180° peel adhesion on stainless steel after 20 minutes of at least 20 Newton/25 mm, a shear adhesion time of at least 3000 minutes, and a SAFT failure temperature of at least 55° C.

A hundredth aspect which is a tire tread composition comprising a rubber polymer, a filler, and an oligoester.

A hundred and first aspect which is a tire tread composition comprising a rubber polymer, a filler, and an oligoester, wherein the tire tread composition exhibits improved wet grip as evidenced by an increased tan δ at 0° C. relative to the same composition wherein the oligoester is replaced by treated distillate aromatic extract (TDAE).

A hundred and second aspect which is the composition of the hundred and first aspect aspect wherein the oligoester has a glass transition temperature of from −60° C. to 0° C.

A hundred and third aspect which is the composition of any of the hundred and first through hundred and second aspects wherein the oligoester is present in an amount of from 1 to 80 parts by weight, based on 100 parts by weight of the rubber polymer.

A hundred and fourth aspect which is the composition of any of the hundred and first through hundred and third aspects wherein the oligoester is present in an amount of from 2 to 75 parts by weight, or of from 5 to 70 parts by weight, or of from 35 to 75 parts by weight, or of from 55 to 75 parts by weight, based on 100 parts by weight of the rubber polymer.

A hundred and fifth aspect which is the composition of any of the hundred and first through hundred and fourth aspects wherein the tire tread composition exhibits improved wet grip as evidenced by at least a 10% increase in tan δ at 0° C., or exhibits improved wet grip as evidenced by at least a 15% increase in tan δ at 0° C. relative to the same composition wherein the oligoester composition is replaced by treated distillate aromatic extract (TDAE).

A hundred and sixth aspect which is a phase change material which comprises an oligoester composition of any of any preceding claim.

A hundred and seventh aspect which is a lubricant which comprises an oligoester composition of any preceding claim.

A hundred and eighth aspect which is a plasticizer which comprises an oligoester composition of any preceding claims.

A hundred and ninth aspect which is the plasticizer of the hundred and eighth aspect further comprising a second plasticizer comprising phthalate ester, azelate ester, 1,2-cyclohexane dicarboxylate ester, trimellitate ester, succinate ester, glutarate ester, adipate ester, sebacate ester, citrate ester, ester, terephthalate ester, epoxidized fatty ester, benzoate ester, a phosphate ester, or a combination of any two or more thereof.

A hundred and tenth aspect which is the oligoester composition of any preceding claim wherein the composition exhibits a mass loss of less than 10% at 160° C. over a time period of 4 hours.

A hundred and eleventh aspect which is the oligoester composition of any preceding claim wherein the composition exhibits a mass loss of less than 3% at 160° C. over a time period of 4 hours.

A hundred and twelfth aspect which is an oligoester composition which is an esterification reaction product of one or more rosins, one or more monocarboxylic acids, one or more polyhydric alcohols, and optionally one or more polycarboxylic acids, wherein the composition has a weight average molecular weight of from 1,000 g/mol to 8,000 g/mol and a Tg of between −80° C. and 100° C.

What is claimed is:

1. An oligoester composition which is a reaction product of a reactant mixture comprising:
    one or more rosins selected from the group consisting of tall oil rosin and gum rosin;
    at least 15% by weight of one or more monocarboxylic acids comprising 6-36 carbon atoms, wherein the monocarboxylic acid is selected from the group consisting of aromatic monofunctional carboxylic acids, heteroaromatic monofunctional carboxylic acids, aliphatic monofunctional carboxylic acids, and cycloaliphatic monofunctional carboxylic acids; and
    5 to 30% by weight of one or more polyhydric alcohols comprising 2-36 carbon atoms, wherein each hydroxyl group of the polyhydric alcohol is separated from the other hydroxyl groups by at least 2 carbon atoms, and the polyhydric alcohol has an average hydroxyl functionality of 2-10;
    wherein the composition has a weight average molecular weight of from 500 g/mol to 8,000 g/mol and a $T_g$ of between −80° C. and 100° C.; and
    wherein the composition has a hydroxyl number of less than 30 mg KOH/gram.

2. The oligoester composition of claim 1, wherein the reactant mixture further comprises:
    less than Q % by weight one or more polycarboxylic acids, where Q is defined by the formula $$10-2\left(\sum_{\substack{polycarboxylic\\acids}} (XY)\right)$$

wherein:
    Σ denotes the mathematical summation of the product of X and Y for each of the one or more polycarboxylic acids;
    X is the carboxylic acid functionality of the polycarboxylic acid and is an integer ranging from 2 to 4; and
    Y is the polycarboxylic acid weight fraction, and ranges from 0 to 1 where the sum of the weight fractions for the one or more polycarboxylic acids equals 1;
    wherein the polycarboxylic acid comprises 2-54 carbon atoms and is selected from the group consisting of dicarboxylic acids, tricarboxylic acids and tetracarboxylic acids.

3. The oligoester composition of claim 1, wherein the reaction is an esterification reaction, a transesterification reaction, an interesterification reaction, or combinations thereof.

4. The oligoester composition of claim 2 wherein the reactant mixture comprises from greater than 0% to 4% by weight one or more dicarboxylic acids.

5. The oligoester composition of claim 2, wherein the reactant mixture comprises from greater than 0% to 4% by weight one or more dicarboxylic acids and from 9% to 18% by weight of one or more polyhydric alcohols.

6. The oligoester composition of claim 2, wherein the one or more polycarboxylic acids are selected from the group consisting of adipic acid, 3-methyladipic acid, succinic acid, sebacic acid, 1,4-cyclohexanedicarboxylic acid, 1,3-cyclohexanedicarboxylic acid, 1,2-cyclohexanedicarboxylic acid, rosin dimer, isophthalic acid, terephthalic acid, phthalic acid, tall oil fatty acid dimer, hydrogenated tall oil fatty acid dimer, 2-(2-carboxyphenyl)benzoic acid, 2,5-furandicarboxylic acid, camphoric acid, cis-norbornene-endo-2,3-dicarboxylic acid, trimellitic acid, and combinations thereof.

7. The oligoester composition of claim 1, wherein the reaction mixture comprises from 40% to 80% by weight one or more monocarboxylic acids.

8. The oligoester composition claim 7, wherein the one or more monocarboxylic acids comprise a fatty acid, a tall oil fatty acid, or combinations thereof.

9. The oligoester composition of claim 1, wherein the one or more polyhydric alcohols are selected from the group consisting of ethylene glycol, propylene glycol, diethylene glycol, triethylene glycol, tetraethylene glycol, polyethylene glycol, neopentylglycol, trimethylene glycol, glycerol, trimethylolpropane, trimethylolethane, pentaerythritol, dipentaerythritol, tripentaerythritol, 1,4-cyclohexanediol, polyglycerol, polyglycerol-3, polyglycerol-4, cyclohexane-1,4-dimethanol, tricyclo[5.2.1.0$^{(2.6)}$]decane-4,8-dimethanol, hydrogenated bisphenol A (4,4'-Isopropylidenedicyclohexanol), mannitol, sorbitol, xylitol, maltitol, lactitol, and combinations thereof.

10. The oligoester composition of claim 2, wherein the reaction mixture comprises:
    from 5% to 75% by weight of the one or more rosins;
    from 25% to 85% by weight of the one or more monocarboxylic acids;
    from 9 to 18% by weight of the one or more polyhydric alcohols; and
    from greater than 0% to less than 4% by weight of the one or more polycarboxylic acids.

11. The oligoester composition of claim 1, wherein the composition exhibits a mass loss of less than 10% at 160° C. over a time period of 4 hours.

12. A plasticizer comprising the oligoester composition of claim 1.

13. A tire tread composition comprising a rubber polymer, a filler, and the oligoester composition of claim 1.

14. A polymeric composition comprising
    (a) a polymer, and
    (b) the oligoester composition of claim 1.

15. The polymeric composition of claim 14, wherein the polymer is selected from the group consisting of a polyacrylate, a polyolefin, a polyamide, a polyvinyl ether, a polyurethane, a polyester, a polyvinyl ester, copolymers thereof, and blends thereof.

16. The polymeric composition of claim 14, wherein the polymer is selected from the group consisting of acrylonitrile-butadiene-styrene, an acrylic polymer, an acrylic copolymer, bromobutyl rubber, butyl terpolymer, cellulose acetate, cellulose butyrate, cellulose propionate, cellulose nitrate, chlorinated polyvinylchloride, polyvinylchloride, chlorosulphonated polyethylene, cyanoacrylates, styrenic block copolymer consisting of polystyrene blocks and rubber blocks wherein the rubber blocks consist of polybutadiene, polyisoprene or hydrogenated versions thereof, caprolactone-styrene diblock copolymers, urethane acrylic copolymer, urethanes, polyolefins, ethylene-propylene-diene copolymer, epoxy resins, ethylene-vinyl acetate copolymer, ionomers, nitrile rubber, polyacrylonitrile, polyamides, polyamine, polyaniline, polybutadiene, polybutylene, poly(butyl methacrylate), polycarbonate, polyester, polyetherimide, polyethylacrylate, polyethylene, poly(ethylene)oxide, polyisobutylene, polyisoprene, polyimide, polylactide, polymethylmethacrylate, polypropylene, poly(N-vinylcarbazole), poly(N-vinyl pyrrolidone), polyphenylene ether, polystyrene, polysulfone, polysulfide, polyvinylacetate, polyvinylalcohol, polyvinylbutyral, polyvinylchloride, polyvinylidinefluoride, polyvinylidinechloride, polyurethanes, protein, natural rubber, silicone, styrene-butadiene rubber, styrene-butadiene-styrene, starch, copolymers thereof, and blends thereof.

17. A method for preparing an oligoester composition comprising: esterifying a mixture comprising
one or more rosins selected from the group consisting of tall oil rosin and gum rosin, at least 15% by weight of one or more monocarboxylic acids comprising 6-36 carbon atoms,
wherein the monocarboxylic acid is selected from the group consisting of aromatic monofunctional carboxylic acids, heteroaromatic monofunctional carboxylic acids, aliphatic monofunctional carboxylic acids, and cycloaliphatic monofunctional carboxylic acids,
optionally from greater than 0% to 4% by weight of one or more polycarboxylic acids,
wherein the polycarboxylic acid comprises 2-54 carbon atoms and is selected from the group consisting of dicarboxylic acids, tricarboxylic acids and tetracarboxylic acids, and with 5 to 30% of one or more polyhydric alcohols, to form the oligoester composition,
wherein the polyhydric alcohol comprises 2-36 carbon atoms, each hydroxyl group of the polyhydric alcohol is separated from the other hydroxyl groups by at least 2 carbon atoms, and the polyhydric alcohol has an average hydroxyl functionality of 2-10;
wherein the oligoester composition has a weight average molecular weight of from 500 g/mol to 8,000 g/mol and a $T_g$ of between −80° C. and 100° C.; and
wherein the oligoester composition has a hydroxyl number of less than 30 mg KOH/gram.

18. An oligoester composition formed by the method of claim 17.

19. An oligoester composition which is an esterification reaction product of a reactant mixture comprising:
one or more rosins selected from the group consisting of tall oil rosin and gum rosin,
at least 15% by weight of one or more monocarboxylic acids comprising 6-36 carbon atoms and selected from the group consisting of aromatic monofunctional carboxylic acids, heteroaromatic monofunctional carboxylic acids, aliphatic monofunctional carboxylic acids, and cycloaliphatic monofunctional carboxylic acids,
9% by weight to 18% by weight of one or more polyhydric alcohols comprising 2-36 carbon atoms, wherein each hydroxyl group of the polyhydric alcohol is separated from the other hydroxyl groups by at least 2 carbon atoms, and the polyhydric alcohol has an average hydroxyl functionality of 2-10, and
optionally from greater than 0% to 4% by weight of one or more polycarboxylic acids, wherein the polycarboxylic acid comprises 2-54 carbon atoms and is selected from the group consisting of dicarboxylic acids, tricarboxylic acids and tetracarboxylic acids,
wherein the composition has a weight average molecular weight of from 500 g/mol to 8,000 g/mol and a $T_g$ of between −80° C. and 100° C.; and
wherein the oligoester composition has a hydroxyl value of 30 mg KOH/g or less.

20. An oligoester composition which is the reaction product of:
one or more rosins selected from the group consisting of tall oil rosin and gum rosin;
at least 15% by weight of one or more monocarboxylic acids comprising 6-36 carbon atoms and selected from the group consisting of aromatic monofunctional carboxylic acids, heteroaromatic monofunctional carboxylic acids, aliphatic monofunctional carboxylic acids, and cycloaliphatic monofunctional carboxylic acids;
5 to 30% by weight of one or more polyhydric alcohols comprising 2-36 carbon atoms, wherein each hydroxyl group of the polyhydric alcohol is separated from the other hydroxyl groups by at least 2 carbon atoms, and the polyhydric alcohol has an average hydroxyl functionality of 2-10; and
less than Q % by weight one or more polycarboxylic acids, wherein the polycarboxylic acid comprises 2-54 carbon atoms and is selected from the group consisting of dicarboxylic acids, tricarboxylic acids and tetracarboxylic acids; and where Q is defined by the formula:

$$10 - 2\left(\sum_{\substack{polycarboxylic \\ acids}} (XY)\right)$$

wherein:
$\Sigma$ denotes the mathematical summation of the product of X and Y for each of the one or more polycarboxylic acids;
X is the carboxylic acid functionality of the polycarboxylic acid, and is an integer ranging from 2 to 4; and
Y is the polycarboxylic acid weight fraction, and ranges from 0 to 1 where the sum of the weight fractions for the one or more polycarboxylic acids equals 1; wherein the oligoester composition has a softening point of 85° C. or less; and
wherein the oligoester composition has a hydroxyl value of 30 mg KOH/g or less.

21. A pressure sensitive adhesive (PSA) comprising a polymer and an oligoester composition,
wherein the adhesive exhibits a loop tack adhesion value on stainless steel of at least 25 Newton/25 mm, a 180° peel adhesion on stainless steel after 20 minutes of at least 20 Newton/25 mm, a shear adhesion time of at least 3000 minutes, and a SAFT failure temperature of at least 55° C.; and wherein the oligoester composition is a reaction product of a reactant mixture comprising:

one or more rosins selected from the group consisting of tall oil rosin and gum rosin;

at least 15% by weight of one or more monocarboxylic acids comprising 6-36 carbon atoms, wherein the monocarboxylic acid is selected from the group consisting of aromatic monofunctional carboxylic acids, heteroaromatic monofunctional carboxylic acids, aliphatic monofunctional carboxylic acids, and cycloaliphatic monofunctional carboxylic acids;

optionally from greater than 0% to 4% by weight of one or more polycarboxylic acids, wherein the polycarboxylic acid comprises 2-54 carbon atoms and is selected from the group consisting of dicarboxylic acids, tricarboxylic acids and tetracarboxylic acids; and 5 to 30% by weight of one or more polyhydric alcohols comprising 2-36 carbon atoms, wherein each hydroxyl group of the polyhydric alcohol is separated from the other hydroxyl groups by at least 2 carbon atoms, and the polyhydric alcohol has an average hydroxyl functionality of 2-10;

wherein the composition has a weight average molecular weight of from 500 g/mol to 8,000 g/mol and a $T_g$ of between −80° C. and 100° C.; and wherein the oligoester has a hydroxyl number of less than 30 mg KOH/gram.

\* \* \* \* \*